(12) United States Patent
Al-Khoraidly et al.

(10) Patent No.: US 7,519,644 B2
(45) Date of Patent: Apr. 14, 2009

(54) FINITE FIELD SERIAL-SERIAL MULTIPLICATION/REDUCTION STRUCTURE AND METHOD

(75) Inventors: Abdulaziz Al-Khoraidly, Dhahran (SA); Mohammad K. Ibrahim, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 913 days.

(21) Appl. No.: 10/854,295

(22) Filed: May 27, 2004

(65) Prior Publication Data

US 2005/0267926 A1    Dec. 1, 2005

(51) Int. Cl.
  *G06F 7/00* (2006.01)
(52) U.S. Cl. ..................................... 708/492
(58) Field of Classification Search .................. 708/492
  See application file for complete search history.

(56) References Cited

U.S. PATENT DOCUMENTS

| | | | |
|---|---|---|---|
| 4,200,770 A | 4/1980 | Hellman et al. | |
| 4,797,848 A | 1/1989 | Walby | |
| 5,101,431 A | 3/1992 | Even | |
| 5,414,651 A | 5/1995 | Kessels | |
| 5,602,767 A * | 2/1997 | Fettweis et al. | 708/492 |
| 5,680,340 A * | 10/1997 | Glover et al. | 708/492 |
| 5,742,534 A | 4/1998 | Monier | |
| 5,931,894 A * | 8/1999 | Wei | 708/492 |
| 6,044,390 A * | 3/2000 | Golnabi et al. | 708/492 |
| 6,052,704 A * | 4/2000 | Wei | 708/492 |
| 6,061,706 A | 5/2000 | Gai et al. | |
| 6,151,393 A | 11/2000 | Jeong | |
| 6,377,969 B1 | 4/2002 | Orlando et al. | |
| 6,434,585 B2 | 8/2002 | McGregor et al. | |
| 6,598,061 B1 | 7/2003 | Symes et al. | |
| 6,917,218 B2 * | 7/2005 | Kim et al. | 326/38 |
| 2002/0013799 A1 | 1/2002 | Blaker | |
| 2002/0021803 A1 | 2/2002 | Solinas | |
| 2002/0052906 A1 | 5/2002 | Chang | |
| 2002/0110240 A1 | 8/2002 | Chen et al. | |
| 2002/0116429 A1 | 8/2002 | Chen et al. | |
| 2002/0161810 A1 | 10/2002 | Mellott et al. | |
| 2002/0184281 A1 | 12/2002 | Chen et al. | |
| 2003/0009503 A1 | 1/2003 | Glaser et al. | |
| 2003/0059042 A1 | 3/2003 | Okeya et al. | |
| 2003/0093450 A1 * | 5/2003 | Chen | 708/492 |
| 2003/0123654 A1 | 7/2003 | Lambert | |
| 2005/0004966 A1 * | 1/2005 | Fan | 708/492 |

OTHER PUBLICATIONS

A. Aggoun et al., "Area-Time Efficient Serial-Serial Multipliers" KFUPM, Dep't of Computer Engineering, no dated.

(Continued)

*Primary Examiner*—Tan V Mai
(74) *Attorney, Agent, or Firm*—Lowe Hauptman Ham & Berner, LLP

(57) ABSTRACT

A method or cryptographic system for communicating securely over an insecure communication channel of the type which communicates a message from a transmitter to a receiver includes the step of providing a finite filed serial-serial multiplication/reduction structure wherein an initial delay and clock-cycle are inherently independent of word length and wherein input operands are serially entered one digit at a time and the output result is computed serially one digit at a time, wherein the digit size can be one bit or more. As disclosed, the multiplication structure is scalable and a serial transfer reduces the bus width needed to transfer data back and forth between memory and a multiplication/reduction step. A finite field multiplication structure in which an operand multiplication and a finite field reduction are formulated as a serial-serial computation is also disclosed.

19 Claims, 5 Drawing Sheets

The Structure of a Serial-Serial Finite Field Multiplier Cell (cell *s*, cycle *g*)

OTHER PUBLICATIONS

Tenca, "A Scalable Architecture for Montgomery Multiplication" Oregon State University, Corvallis, Oregon, no dated.

Orup, "Simplifying Quotient Determination in High-Radix Modular Multiplication" Aarhus University, Computer Science Dep't. (1995).

M.C. Mekhallalati et al., "Radix Modular Multiplication Algorithm" University of Nottingham, United Kingdom, no dated.

Miller, "Use of Elliptic Curves in Cryptography" Crypto 85, LNCS 218, pp. 417-426 (1986).

* cited by examiner

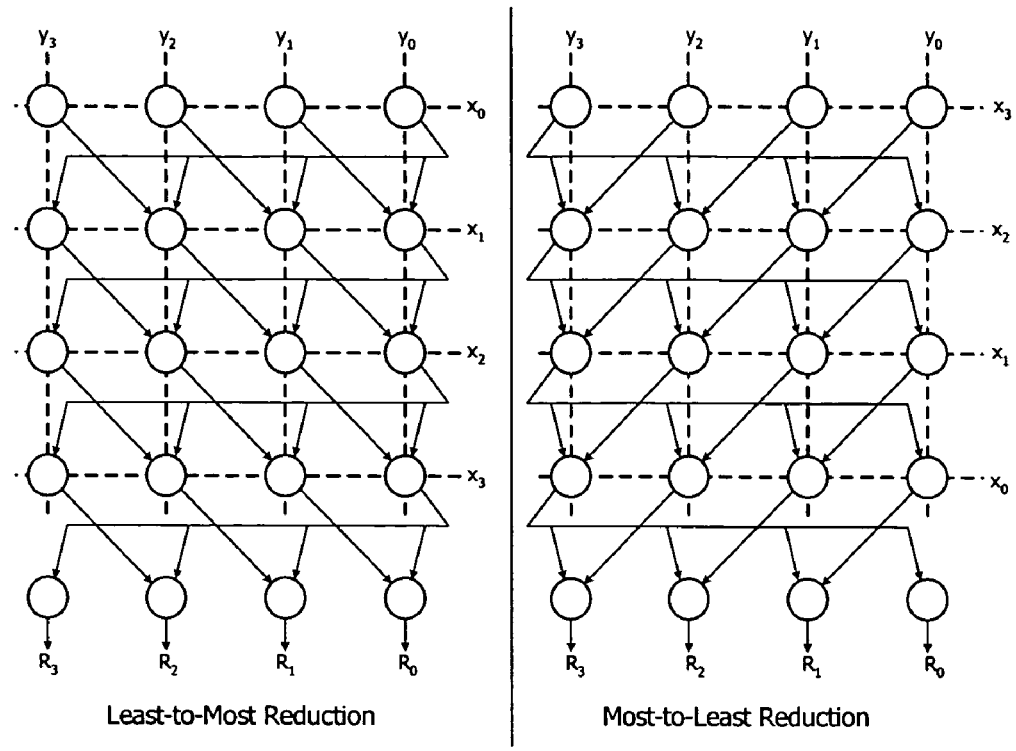
Figure 1: Different Finite Field Reduction Dataflows
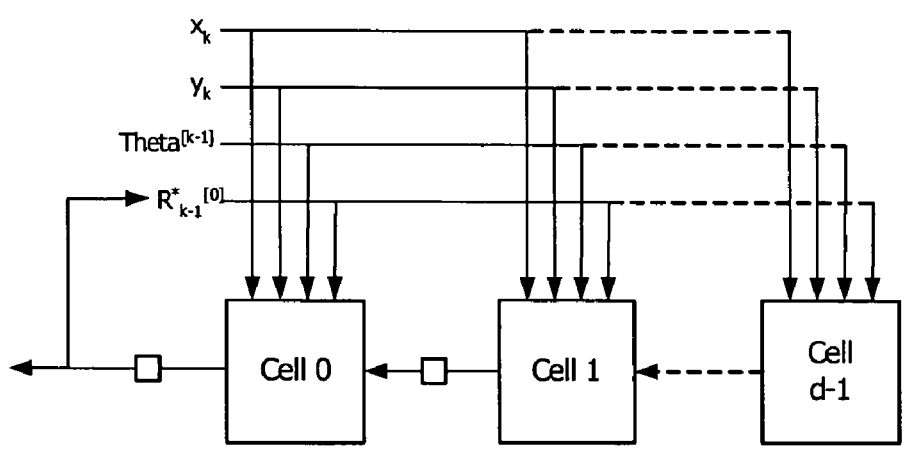
Figure 2: A Basic Serial-Serial Finite Field Multiplier

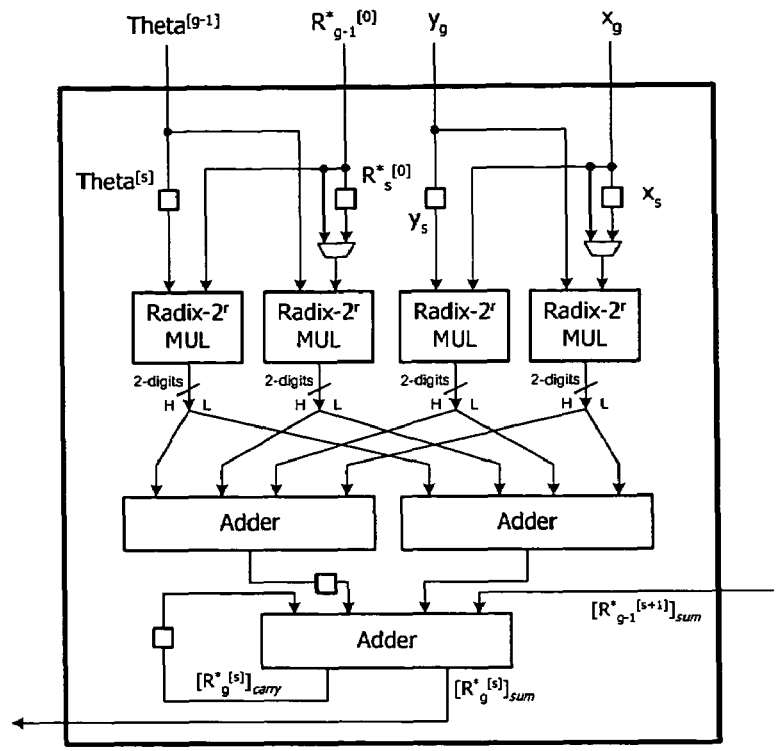
Figure 3: The Structure of a Serial-Serial Finite Field Multiplier Cell (cell $s$, cycle $g$)
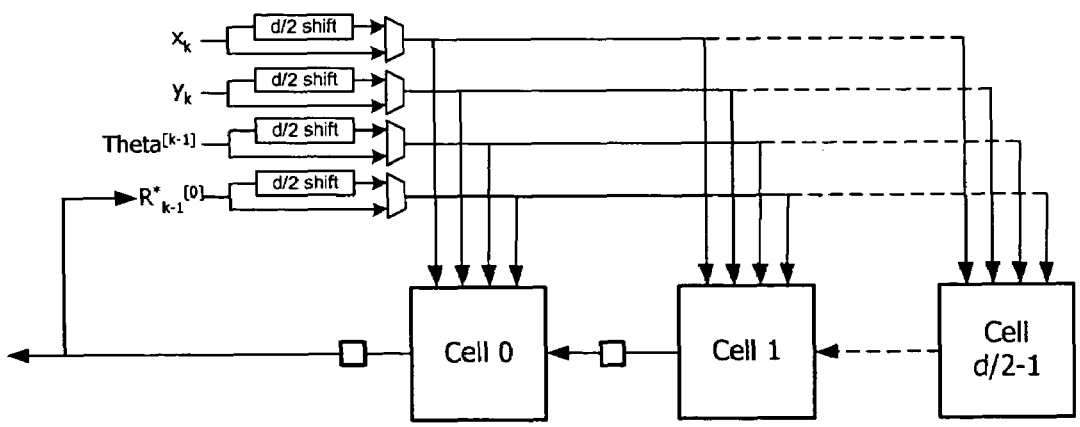
Figure 4: An Area-Efficient Serial-Serial Finite Field Multiplier

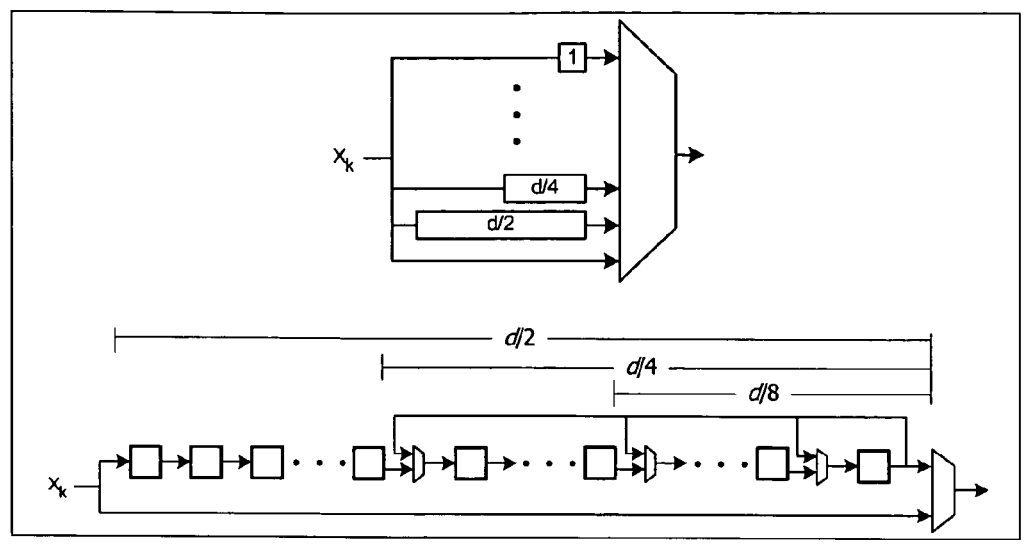
Figure 5: Two implementations of the input feeding circuit
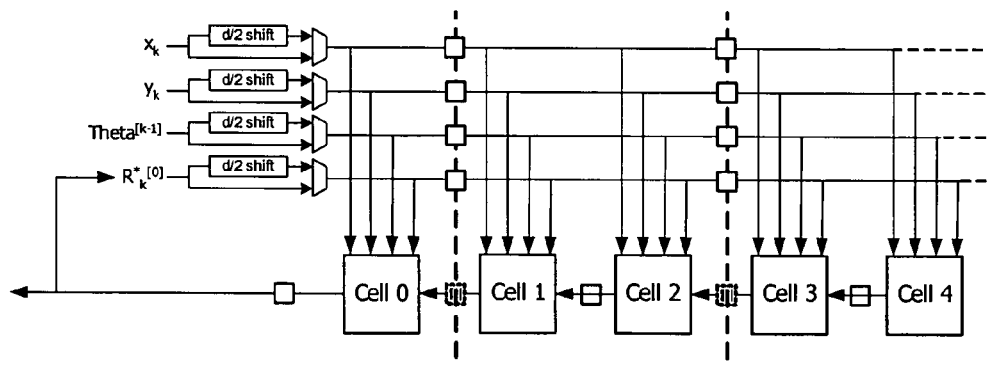
Figure 6: Serial-Serial Finite Field Multiplier as a Systolic Array
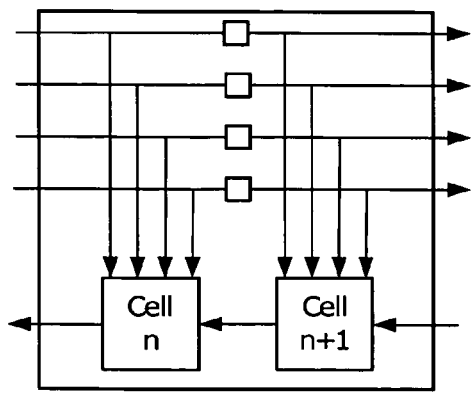
Figure 7: The Systolic Serial-Serial Finite field Multiplier Cell

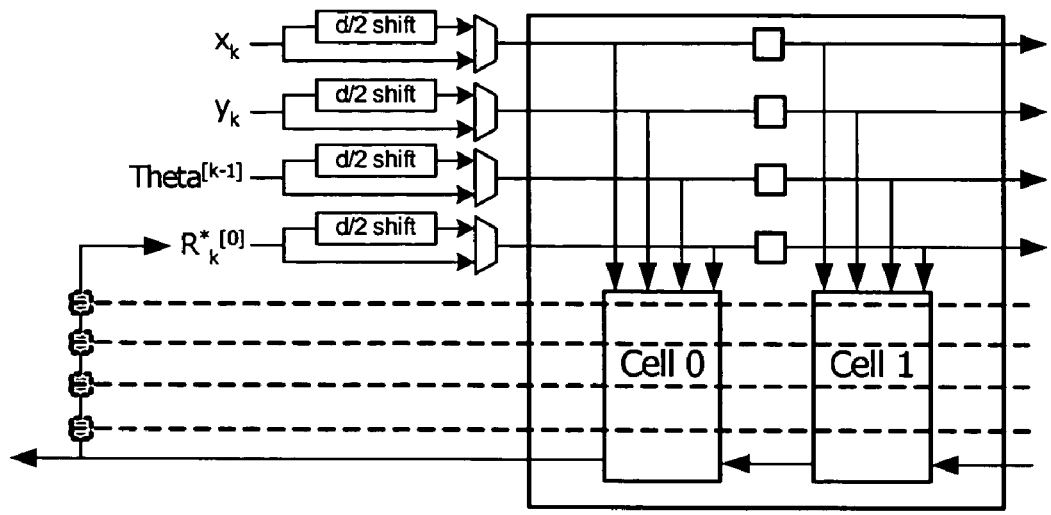
Figure 8: Pipelining the Serial-Serial Finite Field Multiplier
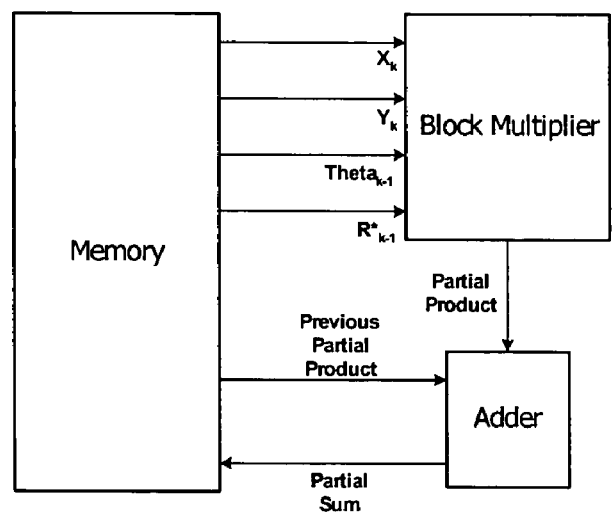
Figure 9: The Block Diagram of a Scalable Serial-Serial Finite Field Multiplier

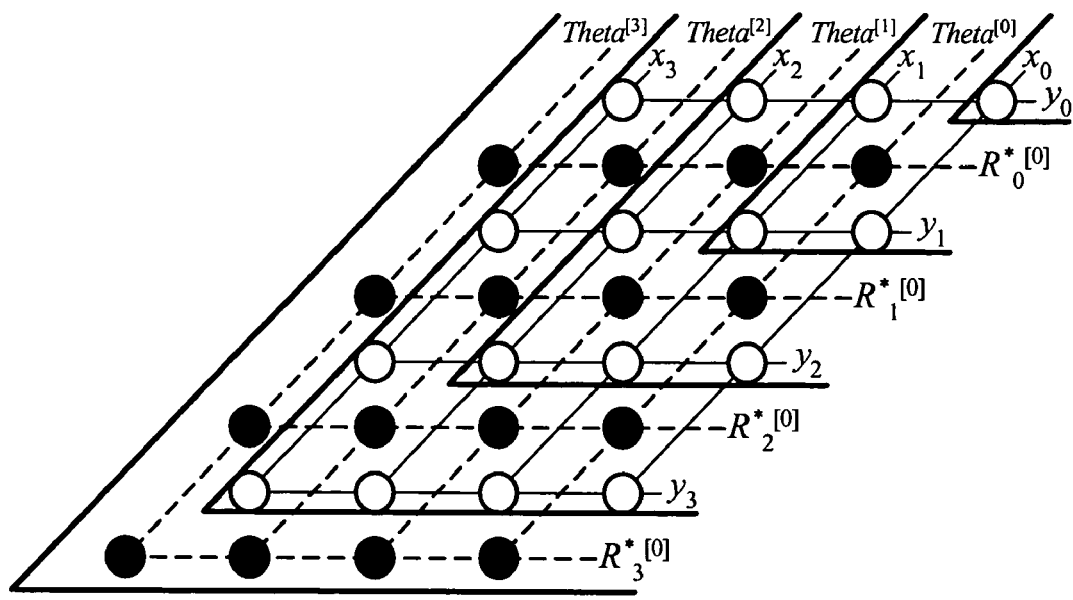
Figure 10: An Illustration of the Time-space Mapping of Serial-serial Finite Field Multiplication

FINITE FIELD SERIAL-SERIAL MULTIPLICATION/REDUCTION STRUCTURE AND METHOD

A. BACKGROUND OF THE INVENTION

1. Field of the Invention

This invention relates to high-radix finite field multiplication methods and architectures, which constitutes an integral operation in cryptographic systems.

2. Field Multiplication in Cryptography

Due to the security requirements of data transfer and digitization, the current need for cryptography for data security mechanism is ever growing. The basic principle of cryptography is that a plaintext is converted into a ciphertext through encryption using a particular encryption key. When a receiver receives the ciphertext, decryption with a key that is related to the encryption key can recover the plaintext. Because the data is transferred or stored as ciphertext, data security is achieved since an adversary cannot interpret the ciphertext.

In particular, public-key cryptography enables secure communication between users that have not previously agreed upon any shared keys. This is most often done using a combination of symmetric and asymmetric cryptography: public-key techniques are used to establish user identity and a common symmetric key, and a symmetric encryption algorithm are used for the encryption and decryption of the actual messages. The former operation is called key agreement. Prior establishment is necessary in symmetric cryptography, which uses algorithms for which the same key is used to encrypt and decrypt a message. Public-key cryptography, in contrast, is based on key pairs. A key pair consists of a private key and a public key. As the names imply, the private key is kept private by its owner, while the public key is made public (and typically associated to its owner in an authentic manner). In asymmetric encryption, the encryption step is performed using the public key, and decryption using the private key. Thus the encrypted message can be sent along an insecure channel with the assurance that only the intended recipient can decrypt it.

The use of cryptographic key pairs is disclosed in the U.S. Patent of Hellman U.S. Pat. No. 4,200,770 which is incorporated herein in its entirety by reference. The Hellman patent also disclosed the application of key pairs to the problem of key agreement over an insecure communication channel. The algorithms specified in the aforementioned patent relies for their security on the difficulty of the mathematical problem of finding a discrete logarithm.

In order to undermine the security of a discrete-logarithm based crypto-algorithm, an adversary must be able to perform the inverse of finite field exponentiation (i.e., solve a discrete logarithm problem). There are mathematical methods for finding a discrete logarithm (e.g., the Number Field Sieve), but these algorithms would take an unreasonably long time using sophisticated computers when certain conditions are met in the specification of the crypto algorithm.

In particular, it is necessary for the used numbers involved to be large enough. The larger the numbers used, the more time and computing power is required to find the discrete logarithm and break the cryptosystem. On the other hand, very large numbers lead to very long public keys and transmissions of cryptographic data. The use of very large numbers also requires large amounts of time and computational power in order to perform the crypto algorithm. Thus, cryptographers are always looking for ways to minimize the size of the numbers involved, and the time and power required, in performing the encryption and/or authentication algorithms.

The payoff for finding such a method is that cryptography can be done faster, cheaper, and in devices that do not have large amounts of computational power (e.g., hand-held smart-cards).

A discrete-logarithm based crypto-algorithm can be performed in any mathematical setting in which certain algebraic rules hold true. In mathematical language, the setting must be a finite cyclic group. The choice of the group is critical in a cryptographic system. The discrete logarithm problem may be more difficult in one group than in another for which the numbers are of comparable size. The more difficult the discrete logarithm problem, the smaller the numbers that are required to implement the crypto-algorithm while maintaining the same level of security. Working with smaller numbers is easier, more efficient and requires less storage compared to working with larger numbers. So, by choosing the right group, a user may be able to work with smaller numbers, make a faster cryptographic system, and get the same, or better, cryptographic strength than from another cryptographic system that uses larger numbers.

A method of adapting discrete-logarithm based algorithms to the setting of elliptic curves was disclosed independently by V. Miller, in "Use of elliptic curves in cryptography" on Advances in Cryptology—CRYPTO'85, LMCS 218, pp. 417-426, (1986) and by N. Koblitz, "A Course in Number Theory and Cryptography," (1987). It appears that finding discrete logarithms in this kind of group is particularly difficult. Thus elliptic curve-based crypto algorithms can be implemented using much smaller numbers than in a finite-field setting of comparable cryptographic strength. Hence, the use of elliptic curve cryptography is an improvement over finite-field based public-key cryptography. The Elliptic Curve Cryptosystem relies upon the difficulty of the Elliptic Curve Discrete Logarithm Problem (ECDLP) to provide its effectiveness as a cryptosystem. Using multiplicative notation, the problem can be described as: given points B and Q in the group, find a number k such that $B^k=Q$; where k is called the discrete logarithm of Q to the base B. Using additive notation, the problem becomes: given two points B and Q in the group, find a number k such that $kB=Q$.

In an Elliptic Curve Cryptosystem, the integer k is kept private and is often referred to as the secret key. The point Q together with the base point B are made public and are referred to as the public key. The security of the system, thus, relies upon the difficulty of deriving the secret k, knowing the public points B and Q. The main factor that determines the security strength of such a system is the size of its underlying finite field. In a real cryptographic application, the underlying field is made so large that it is computationally infeasible to determine k in a straightforward way by computing all the multiples of B until Q is found.

The core of the elliptic curve geometric arithmetic is an operation called scalar multiplication which computes kB by adding together k copies of the point B. Scalar multiplication over elliptic curve is also referred to as exponentiation over elliptic curve.

Another well-known public key cryptosystem is Rivest, Shamir, Adleman (RSA) which is also based on the discrete logarithm problem of over the field GF(p). RSA requires field exponentiation over GF(p).

In what follows, field exponentiation is used to refer to scalar multiplication in elliptic curve cryptography, as well as finite field exponentiation in RSA cryptography.

A drawback of such cryptographic systems is that calculation of field exponentiation remains a daunting mathematical task even to an authorized receiver using a high speed computer. With the prevalence of public computer networks used to transmit confidential data for personal, business and governmental purposes, it is anticipated that most computer users will want cryptographic systems to control access to their data. Despite the increased security, the difficulty of finite field exponentiation calculations will substantially drain computer resources and degrade data throughput rates, and thus represents a major impediment to the widespread adoption of commercial cryptographic systems.

Accordingly, a critical need exists for an efficient finite field exponentiation method and apparatus to provide a sufficient level of communication security while minimizing the impact to computer system performance and data throughput rates.

Field exponentiation over an elliptic curve is heavily dependent on field multiplications. Point addition and doubling, which are the basic operations for exponentiation over an elliptic curve, require many field multiplication operations.

Field multiplication is also the basic operation used to compute field exponentiation in RSA cryptography, which is used in smart cards or other secure devices. RSA requires the rapid finite field multiplication of large integers, for example 512- or 1024-bits in length, in order to carry out finite field exponentiations.

Therefore, field multiplication is widely used in encryption/decryption, authentication, key distribution and many other applications such as those described above.

3. Prior Art of Field Multiplication:

Finite field multiplication can be described as follows. Given two elements, X and Y, that are members of a field, then X and Y, can be represented as polynomials, $$X = \sum_{i=0}^{d-1} x_i \mu^i \quad (1)$$

$$Y = \sum_{i=0}^{d-1} y_i \mu^i \quad (2)$$

where
(i) in case of GF(p), $\mu=2^r$ is the radix and $x_i, y_i$ are radix-$2^r$ digits which could also be represented in redundant form, and
(ii) in the case of GF($p^m$), $\mu=\alpha^r$, $\alpha$ is the root of the generator polynomial, and $x_i$ and $y_i$ are digit polynomials of X and Y respectively and whose coefficients are elements of $Z_p$.

The field multiplication of X and Y is given by, $$R = XY \mod G(\mu) \quad (3)$$

where $$G(\mu) = \sum_{i=0}^{d} g_i \mu^i \quad (4)$$

where
(i) in the case of GF(p), G($\mu$) is the modulus M and $g_i$ are radix-$2^r$ digits which could also be represented in redundant form, and
(ii) in the case of GF($p^m$), G($\mu$) is the generator polynomial, and $g_i$ is a digit polynomial of G($\mu$) with coefficients that are elements of $Z_p$.

Finite field multiplication consists of two stages: operand multiplication and field reduction. Several field multiplication algorithms have been proposed. It is well known that field reduction after operand multiplication is not as efficient as reduction during multiplication. In the later, the final result of field multiplication is obtained by applying corrections to partial products as they are generated and accumulated.

Field reduction of the generated partial products can be carried out iteratively starting form the most significant digit or the least significant digit.

Montgomery multiplication is a famous reduction-during-multiplication algorithm, which starts from the least significant position. The original Montgomery algorithm was proposed for GF(p) and is based on binary representation of the elements of the field. However, it has been generalized for other fields as well as for higher radix representation of the elements of the field.

In Montgomery multiplication, each digit of the operand X, starting with the least significant digit, is multiplied with the digits of the operand Y. The field reduction is carried from the least significant digit, since the least significant digits are generated first. The algorithm can be described using the following iteration, $$R_{l-1} = (x_{l-1} Y + \mu^{-1} R_{l-2}) \mod G(\mu) \quad (5)$$

The final field multiplication result of Montgomery algorithm has the form, $$R = XY\mu^{-d} \mod G(\mu) \quad (6)$$

The factor $\mu^{-d}$ is inherent in all least significant digit first algorithms, because field reduction starting from the least significant digit is equivalent to a division by $\mu^{-1}$ in each iteration as shown in equation (5).

Least-significant-digit-first algorithms are more natural for GF(p) due to the carry propagation from the least to most significant digits. However, these algorithms are not usually used for GF($p^m$) since there is no carry propagation between digit's significance. For GF($p^m$), most-significant-digit-first algorithms are more efficient since they do not result in any additional scaling factor such as that in equation (6), and produce the final un-scaled result at the end of the multiplication algorithm.

Least-significant-digit-first and most-significant-digit-first algorithms can be implemented using a variety of structures. Most of the existing structures are effectively based on different time-space mapping of the dataflow diagrams. The dataflow consists of nodes and edges. The nodes represent functional units and the edges represent flow of data between nodes.

It should be noted that for GF($p^m$), the carry edges do not exist since there is no carry propagation between digit's significance.

On one end of the spectrum, an array of processing elements is used, where each processing element performs the computation of a single node in graphs such as those shown in FIG. 1. Such realizations are usually referred to as parallel implementations.

Parallel finite-field multipliers have been reported in the U.S. Patent of Geong, U.S. Pat. No. 6,151,393 and in the published applications of Chen et al., Number 2002/0184281 and Glaser et al., Number 2003/0009503 each of which is incorporated herein in its entirety.

Parallel implementations are not efficient for large word-lengths such as those encountered in cryptography due to the huge area and high power requirements.

The other end of the spectrum is to use one processing element to implement the operation of all the nodes in the graphs such as those in FIG. 1. Such realizations are usually referred to as serial implementations. Serial implementations are not efficient for large word lengths such as those encountered in cryptography due to their long execution time.

Other variations of the basic serial finite field multiplication algorithms have also been proposed where a digit of one operand is multiplied by a block of another operand as shown in the published patent applications of Chin-Long Chen et al., Numbers 2002/0116429, 2002/0116430 and 2002/0110240 each of which is incorporated herein in its entirety. A single digit-block multiplier is used to carry out the complete multiplication in a serial fashion. Usually, the block size is larger than the digit size to speed up the computations of the basic serial multiplier. As a consequence, such multiplication algorithms require different bus-widths between the memory module and the digit-block multiplier module.

Another implementation style is mapping dataflow graphs such as those in FIG. 1 into a linear array of processing elements. The mapping can be done in one of two ways: (i) by projecting along the vertical axis to obtain the serial-parallel implementation as disclosed in an article by M. C. Mekhallalati, M. K. Ibrahim, and A. S. Ashur, entitled "Radix Modular Multiplication Algorithm" published in the Journal of Circuits and Systems, and Computers, Vol. 6, No. 5, pages 547-567, 1996. or (ii) by projecting along the horizontal-axis to obtain the serial-serial implementation as disclosed by A. F. Tenca, and C. K. Koc, in "A Scalable Architecture for Montgomery Multiplication" in Cryptographic Hardware and Embedded Systems, Lecture Notes in Computer Science No. 1717, pages 94-108, Springer Verlag, Berlin, Germany, 1999 each of which are incorporated herein in their entirety by reference.

It is well know that using more than one processing element gives a better trade-off between area and time than the parallel or serial realization.

In serial-parallel structures, the digits of one of the input operands are fed serially while the digits of the other input operand must be fed in parallel. The reason is that the digits of one of the operands are all required at every cycle.

Serial-parallel realizations have been reported in the above mentioned patents and articles.

In addition, serial-parallel structures have been reported in the U.S. Pat. No. 5,414,651 of Kassels entitled "Arithmetic Unit for Multiplying Long Integers Modulo M and R.S.A. Converter Provided With Such Multiplication Device" and U.S. Pat. No. 6,377,969 of Orlando et al. entitled "Method for Multiplication in Galois Fields Using Programmable Circuits" both of which are incorporated herein in their entirety by reference.

The advantage of the serial-parallel realization is that the first digit of the product needed to perform field reduction is obtained after an initial delay of one cycle. Defining the initial delay as the number of cycles required before the first digit of the result needed for field reduction is obtained, it is clear that the serial-parallel realization inherently has an initial delay which is independent of the word length. The drawbacks of the serial-parallel realizations are as follows:

(i) it requires parallel loading of the digits of one of the operands, since the digits of one of the operands are all required at every cycle. It is significant to note that the use of parallel transfer of data back and forth from memory and the multiplication structures is a major drawback for large word lengths such as those encountered in cryptography. The reason is that parallel loading for large wordlenghs requires large bus-widths which are costly in area and have a significant impact on the execution time.

(ii) it also has to support serial loading of the other operand and hence the hardware must support buses with different bus-widths between the memory module and the multiplier module; one being for parallel communication and one for serial communication.

The major advantage of serial-serial implementations based on dataflow such as those in FIG. 1 is that all the operand communications are serial in nature and hence no parallel loading is needed.

It should be noted that both serial multiplication structures and serial-serial multiplication realizations require only serial communication for all operands and hence require busses with the same bus width. Serial-serial multipliers have the advantage of requiring less number of memory accesses than their serial counterparts. Also, to achieve the same execution time, the bus width of the serial multiplier needs to be higher than that needed in the serial-serial multiplier. Both of these features make serial-serial multiplier ideal for low power devices such as smart cards.

It should be noted that the serial-parallel multipliers in the aforementioned patents can be modified by loading the operand whose digits are needed at every cycle serially one digit at a time into a serial-in-parallel-out register. The drawback is that this will incur an initial delay prior to the commencement of the multiplication operation, which is dependant on the word length. The structures disclosed in the U.S. Patent of Monier, U.S. Pat. No. 5,742,534 and Walby U.S. Pat. No. 4,797,848 use a serial-in-parallel-out register. Such structures incur an initial delay prior to the commencement of the multiplication operation which is dependent on the word length.

The structures in these patents suffer from the same drawback in that the use of a serial-in-parallel-out registers will incur an initial delay prior to the commencement of the multiplication operation, which is dependant on the word length.

Serial-serial structures that do not require all the digits of all the operands in every cycle have been proposed. This can be achieved by folding the structure in FIG. 1 along the horizontal axis. One such structure was reported in the aforementioned article by A. F. Tenca and C. K. Koc. However, such structures have a major drawback in that the initial delay and clock cycle are dependant on the word length of the operands. For large word lengths such as those in cryptography, this long initial delay and clock cycle represent a significant drawback.

The authors of the structure in the aforementioned A. F. Tenca and C. K. Koc article use extra pipelining registers to make the initial delay and the clock cycle independent of the word length. It is significant to note that the use of extra pipelining registers will significantly increase the hardware and will require additional clock cycles, which are proportional to the word length.

A serial-serial finite field reduction structure is disclosed in the U.S. Pat. No. 5,101,431 of Even for "Systolic Array for Modular Multiplication". However, as disclosed therein, the initial delay and clock cycle are dependent on the word length of the operands. For large word lengths such as those in cryptography, the long initial delay and clock cycles are a draw back. The patent also discloses the use of extra pipelining registers to make the initial delay and the clock-cycle independent of the word length. It is significant to note that the use of extra pipelining registers will significantly increase the hardware and will require additional clock-cycles, which are proportional to the word length.

Another serial-serial structure is disclosed in a published patent application of Mellott et al. Number 2002/0161810 entitled "Method and Apparatus for Multiplication and/or Modular Reduction Processing." In this structure the initial delay and clock-cycle are also dependent on the word-length.

However, to reduce the effect of word length dependency, the inventors use a multi-port adder, which may be implemented for example as a tree adder. This will reduce the effect of word length dependency, but it will not eliminate it completely.

It is also significant to note that the use of a multi-port adder will lead to an irregular structure, and hence the structure is not systolic, i.e. it is not modular, and requires irregular communication Therefore there is a need for a realization which (i) allows serial loading of all needed operands, and (ii) has an initial delay and clock cycle which are inherently independent of the word length.

It should also be noted that any new realization must allow for scalability, which is an additional requirement for the application of finite field multiplication in cryptography. Scalable multiplication structures are those that can be reused or replicated in order to generate long-precision results independently of the data path precision for which the unit was originally designed. Scalability is needed because the key lengths could be increased for higher security. Any cryptographic hardware such as smart cards should not become obsolete with a new key length.

B. SUMMARY OF THE INVENTION

In essence, the present invention contemplates a method or cryptographic system for communicating securely over an insecure communication channel of the type which communicates a message from a transmitter to a receiver. The method includes the step of providing a finite filed serial-serial multiplication/reduction structure wherein an initial delay and clock-cycle are inherently independent of word length and wherein input operands are serially entered one digit at a time and the output result is computed serially one digit at a time. The invention also contemplates a serial transfer for reducing the bus width needed to transfer data back and forth between memory and multiplication.

A mathematical description of finite field multiplication is outlined which is inherently and directly amenable for serial-serial implementation.

It should be noted that in serial-serial structures: (i) all the input operands are only needed serially, i.e. one digit at a time, and (ii) the output result is computed serially one digit at a time.

Defining the initial delay as the number of cycles required to obtain the first digit of the multiplication result needed for field reduction, the major advantage of the new formulation over the existing serial-serial ones is that it inherently has an initial delay and clock cycle which is independent of the operand word length. This is quite significant for cryptography which requires large word lengths, because the security of cryptosystems is usually proportional to the word length of the operands.

The structures in this invention are the first finite field serial-serial multiplication/reduction structure where the initial delay and the clock cycle are inherently independent of the word length. It is inherent in that this independence of the word length is achieved without:
1—the need for extra pipeline registers
2—the need for an irregular adder structure
3—the need for serial-in-parallel-out register for the input operand
4—the need for parallel-in-serial-out register for the output operand This inherent word length independence of the initial delay and clock cycle has been achieved by describing both the operand multiplication and the field reduction as serial-serial computations in one formulation.

The resulting structures (i) give better trade-off than purely parallel or serial implementation with respect to time and area, (ii) do not require parallel loading and hence overcomes the limitation of serial-parallel structures, (iii) have an initial delay and clock cycle which is inherently independent of the word length and hence they do not suffer from the drawback of long initial delays and clock cycles inherent in existing serial-serial realizations.

It should be noted that existing serial-serial multipliers can be made to have an initial delay and clock cycle which is independent of the word length by the use of pipelining. However, it is significant to note that the use of extra pipelining registers will significantly increase the hardware and will require additional clock cycles, which are proportional to the word length.

The new description is scalable and applicable for any field. Moreover, it is applicable for both least-to-most or most-to-least computations.

Furthermore, one efficient systolic implementation is outlined.

Since the invention is applicable to both least-to-most and most-to-least, new bi-directional as well as hybrid algorithms and structures are also disclosed.

DESCRIPTION OF THE DRAWINGS

FIG. 1 is a schematic illustration of different finite field reduction data flows;

FIG. 2 is a schematic illustration of a basic serial-serial finite field multiplier in accordance with the present invention;

FIG. 3 shows the general structure for a finite field multiplier cell in accordance with the present invention;

FIG. 4 illustrates an area-efficient serial-serial finite field multiplier in accordance with the present invention;

FIG. 5 illustrates two implementations of the input feeding circuit in accordance with the present invention;

FIG. 6 illustrates a serial-serial finite field multiplier as a systolic array in accordance with the present invention;

FIG. 7 illustrates a systolic serial-serial finite field multiplier cell for use in practicing the present invention;

FIG. 8 illustrates pipelining for a serial-serial finite field multiplier; and FIG. 9 is a block diagram of a scalable serial-serial finite field multiplier.

FIG. 10 is a schematic illustration of the time-space mapping of finite field multiplication in accordance with the present invention.

DESCRIPTION OF THE PREFERRED EMBODIMENTS OF THE INVENTION

The present invention is particularly applicable to elliptic curve cryptography and more particularly to XZ Elliptic Curve Cryptography of the type disclosed in the co-pending application Ser. No. 10/790,677 filed on Mar. 3, 2004 and now issued as U.S. Pat. No. 7,739,546 on May 27, 2008, in the name of Mohammad Ibrahim and which is incorporated herein in its entirety by reference.

As contemplated in the earlier invention, an improved method for communicating securely over an insecure channel using elliptic curve cryptography. The improvement comprises applying projective coordinates in two stages. In a first of the two stages, a projective coordinate is used to embed extra message data bits in the Z coordinate. Then, in a second stage a projective coordinate is used to remove a division operation at each iteration and for randomizing the computation in order to provide a counter measure against differential power analysis.

In a preferred embodiment of the earlier invention, a method for encrypting or encoding and decrypting or decoding a message bit string in an information processing system is provided. The method includes the step of establishing an elliptic curve message point $(X_m Y_m Z_m)$ and embedding a message bit string into the elliptic curve message point. A shared key (k) and a base point $(X_b Y_b Z_b)$ are provided and the scalier multiplication $(X_{bk} Y_{bk} Z_{bk}) = k (X_b Y_b Z_b)$ is computed. A cipher point $(X_c Y_c Z_c)$ is then computed using $(X_c Y_c Z_c) = (X_m Y_m Z_m) + k (X_b Y_b Z_b)$. Appropriate bits of the X-coordinate, $X_c$ and the Z-coordinate $Z_c$ of the cipher point $(X_c Y_c Z_c)$ are then sent to a receiving party and the shared key k and base point $(X_b Y_b Z_b)$ are used in computing a scaller multiplication $(X_{bk} Y_{bk} Z_{bk}) = k (X_b Y_b Z_b)$. Computing the message point $(X_m Y_m Z_m)$ using $(X_m Y_m Z_m) = (X_c Y_c Z_c) + (-k (X_b Y_b Z_b))$ and recovering the message bit string from $X_m$ and $Z_m$ completes the method.

The above encryption method includes the step of providing a finite filed serial-serial multiplication/reduction structure wherein an initial delay and clock-cycle are inherently independent of word length and wherein input operands are serially entered one digit at a time and the output result is computed serially one digit at a time.

1. Digit Serial-Serial Finite Field Multiplication—Basic Equation

Least-to-most finite field multiplication of two d-digit numbers can be performed using Montgomery algorithm, which implements the following formula:

$$R = XY\mu^{-d} \bmod^* G(\mu) \qquad (7)$$

where $$X = \sum_{i=0}^{d-1} x_i \mu^i \qquad (8)$$

$$Y = \sum_{i=0}^{d-1} y_i \mu^i \qquad (9)$$

and A mod*M operation generates an output which is redundant to M but is limited to one bit additional to the word length. Rewriting X in terms of digits, the following is obtained:

$$R = \left(\mu^{-d} \sum_{i=0}^{d-1} x_i Y \mu^i\right) \bmod^* G(\mu) = \left[\mu^{-1}\left(\mu^{-(d-1)} \sum_{i=0}^{d-1} x_i Y \mu^i\right)\right] \bmod^* G(\mu) \qquad (10)$$

Let's denote R by $R_d$. Then, $$R_d = (\mu^{-1} R_{d-1}) \bmod^* G(\mu) \qquad (11)$$

where $$R_{d-1} = \mu^{-(d-1)} \sum_{i=0}^{d-1} x_i Y \mu^i \qquad (12)$$

$$= x_{d-1} Y + \mu^{-1}\left(\mu^{-(d-2)} \sum_{i=0}^{d-2} x_i Y \mu^i\right)$$

$$= x_{d-1} Y + \mu^{-1} R_{d-2}$$

In general, $$R_k = \mu^{-(k)} \sum_{i=0}^{k} x_i Y \mu^i \qquad (13)$$

$$= x_k Y + \mu^{-1}\left(\mu^{-(k-1)} \sum_{i=0}^{k-1} x_i Y \mu^i\right)$$

$$= x_k Y + \mu^{-1} R_{k-1}$$

Substituting for $R_{k-1}$, the following is obtained $$R_k = x_k Y + \mu^{-1} R_{k-1} = x_k Y + \mu^{-1}(x_{k-1} Y + \mu^{-1} R_{k-2}) \qquad (14)$$

By repeating the substitution, we get the following $$R_k = x_k Y + \mu^{-1}(x_{k-1} Y + \mu^{-1}(x_{k-2} Y + \mu^{-1}( \ldots (x_{k-\delta_R+1} Y + \mu^{-1} R_{k-\delta_R}) \ldots ))) \qquad (15)$$

Taking out the least-significant digit of $R_{k-\delta_R}$, which would be discarded anyway by the division, outside all parentheses, we get $$R_k = x_k Y + \mu^{-1}(x_{k-1} Y + \mu^{-1}(x_{k-2} Y + \mu^{-1}( \ldots (x_{k-\delta_R+1} Y + \mu^{-1} R_{k-\delta_R}) \ldots ))) + \mu^{-\delta_R} R_{k-\delta_R}^{[0]} \qquad (16)$$

Since all operations are performed mod $G(\mu)$, any term can be reduced mod $G(\mu)$ without disturbing the final result. It follows that $$R_k = x_k Y + \mu^{-1} R_{k-1} + \mu^{-\delta_R} \bmod G(\mu) \cdot R_{k-\delta_R}^{[0]} \qquad (17)$$

If $\theta = \mu^{-\delta_\theta} \bmod G(\mu)$, then by substituting in the last equation, $$R_k = x_k Y + \mu^{-1} R_{k-1} + \mu^{\delta_\theta - \delta_R} \theta \cdot R_{k-\delta_R}^{[0]} \qquad (18)$$

The introduction of the parameter $\delta_R$ is useful since it enables pipelining of the multiplication process, as will be described in detail later. It is noteworthy that this is not the only way to calculate the correction term $\theta$. While other ways can be found in the literature, it should be clear that all the following equations are applicable to any method of correction term generation.

Unfolding this recurrence, and solving for R, we get $$R = \left[\mu^{-d}\left(\mu^{-\delta_R} XY + \mu^{\delta_\theta - \delta_R} \theta \sum_{k=0}^{d-1} R_k^{[0]} \mu^k\right)\right] \bmod^* G(\mu) \qquad (19)$$

$$= \left[\mu^{-d-\delta_R}\left(XY + \mu^{\delta_\theta} \theta \sum_{k=0}^{d-1} R_k^{[0]} \mu^k\right)\right] \bmod^* G(\mu)$$

Note that X, Y and $\theta$ can be rewritten as $$X = \sum_{i=0}^{d-1} x_i \mu^i = \mu^{-\delta_X} \sum_{i=0}^{d+\delta_X - 1} x_{i-\delta_X} \mu^i \qquad (20)$$

$$Y = \sum_{j=0}^{d-1} y_j \mu^j = \mu^{-\delta_Y} \sum_{j=0}^{d+\delta_Y - 1} y_{j-\delta_Y} \mu^j \qquad (21)$$

$$\theta = \sum_{h=0}^{d-1} \theta^{[h]} \mu^h = \mu^{-\delta_\theta} \sum_{h=0}^{d+\delta_\theta - 1} \theta^{[h-\delta_\theta]} \mu^h \qquad (22)$$

$\delta_\theta$, $\delta_X$ and $\delta_Y$ are introduced to give the freedom for the operands to be supplied with different lag times, and they prove helpful also in the case of multi-precision multiplication. These $\delta$'s are governed by the following relationships:

$$\delta_X, \delta_Y \geq 0$$

$$\delta_R, \delta_\theta \geq 1$$

$$\max(\delta_X, \delta_Y) < \min(\delta_R, \delta_\theta)$$

$$\delta = \max(\delta_R, \delta_\theta)$$

Through rewriting all words as digits, each of the two products can be decomposed in the following way.

$$R = \mu^{-d-\delta_R} \tag{23}$$

$$\left( \sum_{i=0}^{d+\delta_X-1} x_{i-\delta_X} \mu^{i-\delta_X} \sum_{j=0}^{d+\delta_Y-1} y_{j-\delta_Y} \mu^{j-\delta_Y} + \sum_{h=0}^{d+\delta_\theta-1} \theta^{[h-\delta_\theta]} \mu^h \sum_{k=0}^{d-1} R_k^{[0]} \mu^k \right)$$

which can be generalized to $$R = \mu^{-d-\delta_R} \tag{24}$$

$$\left( \sum_{i=0}^{d+\delta-1} x_{i-\delta_X} \mu^{i-\delta_X} \sum_{j=0}^{d+\delta-1} y_{j-\delta_Y} \mu^{j-\delta_Y} + \sum_{h=0}^{d+\delta-1} \theta^{[h-\delta_\theta]} \mu^h \sum_{k=0}^{d-1} R_k^{[0]} \mu^k \right)$$

Equivalently, $$R = \mu^{-1} \left( \mu^{-d-\delta_R+1} \left( \begin{array}{l} \sum_{i=0}^{d+\delta-1} x_{i-\delta_X} \mu^{i-\delta_X} \sum_{j=0}^{d+\delta-1} y_{j-\delta_Y} \mu^{j-\delta_Y} + \\ \sum_{h=0}^{d+\delta-1} \theta^{[h-\delta_\theta]} \mu^h \sum_{k=0}^{d-1} R_k^{[0]} \mu^k \end{array} \right) \right) \tag{25}$$

Denoting R by $R_{d+\delta_R}^*$, this becomes $$R_{d+\delta_R}^* = \mu^{-1} R_{d+\delta_R-1}^* \tag{26}$$

where $$R_{d+\delta_R-1}^* = \mu^{-d-\delta_R+1} \left( \sum_{i=0}^{d+\delta-1} x_{i-\delta_X} \mu^{i-\delta_X} \sum_{j=0}^{d+\delta-1} y_{j-\delta_Y} \mu^{j-\delta_Y} + \sum_{h=0}^{d+\delta-1} \theta^{[h-\delta_\theta]} \mu^h \sum_{k=0}^{d-1} R_k^{*[0]} \mu^k \right) \tag{27}$$

$$R_{d+\delta_R-1}^* = \mu^{-d-\delta_R+1} \left( \begin{array}{l} x_{d+\delta-\delta_X-1} y_{d+\delta-\delta_Y-1} \mu^{2(d+\delta-1)-\delta_X-\delta_Y} + x_{d+\delta-\delta_X-1} \mu^{d+\delta-\delta_X-1} \sum_{j=0}^{d+\delta-2} y_{j-\delta_Y} \mu^{j-\delta_Y} + \\ y_{d+\delta-\delta_Y-1} \mu^{d+\delta-\delta_Y-1} \sum_{i=0}^{d+\delta-2} x_{i-\delta_X} \mu^{i-\delta_X} + \sum_{i=0}^{d+\delta-2} x_{i-\delta_X} \mu^{i-\delta_X} \sum_{j=0}^{d+\delta-2} y_{j-\delta_Y} \mu^{j-\delta_Y} + \\ \theta^{[d+\delta-\delta_\theta-1]} R_{d-1}^{*[0]} \mu^{2(d-1)+\delta-\delta_\theta} + \theta^{[d+\delta-\delta_\theta-1]} \mu^{d+\delta-1} \sum_{k=0}^{d-2} R_k^{*[0]} \mu^k + \\ R_{d-1}^{*[0]} \mu^{d-1} \sum_{h=0}^{d+\delta-2} \theta^{[h-\delta_\theta]} \mu^h + \sum_{h=0}^{d+\delta-2} \theta^{[h-\delta_\theta]} \mu^h \sum_{k=0}^{d-2} R_k^{*[0]} \mu^k \end{array} \right) \tag{28}$$

$$R_{d+\delta_R-1}^* = x_{d+\delta-\delta_X-1} y_{d+\delta-\delta_Y-1} \mu^{d+2\delta-\delta_X-\delta_Y-\delta_R-1} + x_{d+\delta-\delta_X-1} \mu^{\delta-\delta_X-\delta_R} \sum_{j=0}^{d+\delta-2} y_{j-\delta_Y} \mu^{j-\delta_Y} +$$

$$y_{d+\delta-\delta_Y-1} \mu^{\delta-\delta_Y-\delta_R} \sum_{i=0}^{d+\delta-2} x_{i-\delta_X} \mu^{i-\delta_X} + \theta^{[d+\delta-\delta_\theta-1]} R_{d-1}^{*[0]} \mu^{d-1+\delta-\delta_\theta-\delta_R} + \theta^{[d+\delta-\delta_\theta-1]} \mu^{\delta-\delta_R} \sum_{k=0}^{d-2} R_k^{*[0]} \mu^k +$$

$$R_{d-1}^{*[0]} \mu^{-\delta_R} \sum_{h=0}^{d+\delta-2} \theta^{[h-\delta_\theta]} \mu^h + \mu^{-1} \left( \mu^{-d-\delta_R+2} \left( \sum_{i=0}^{d+\delta-2} x_{i-\delta_X} \mu^{i-\delta_X} \sum_{j=0}^{d+\delta-2} y_{j-\delta_Y} \mu^{j-\delta_Y} + \sum_{h=0}^{d+\delta-2} \theta^{[h-\delta_\theta]} \mu^h \sum_{k=0}^{d-2} R_k^{*[0]} \mu^k \right) \right) \tag{29}$$

$$R_{d+\delta_R-1}^* = x_{d+\delta-\delta_X-1} y_{d+\delta-\delta_Y-1} \mu^{d+2\delta-\delta_X-\delta_Y-\delta_R-1} + x_{d+\delta-\delta_X-1} \mu^{\delta-\delta_X-\delta_R} \sum_{j=0}^{d+\delta-2} y_{j-\delta_Y} \mu^{j-\delta_Y} + y_{d+\delta-\delta_Y-1} \mu^{\delta-\delta_Y-\delta_R} \sum_{i=0}^{d+\delta-2} x_{i-\delta_X} \mu^{i-\delta_X} +$$

$$\theta^{[d+\delta-\delta_\theta-1]} R_{d-1}^{*[0]} \mu^{d-1+\delta-\delta_\theta-\delta_R} + \theta^{[d+\delta-\delta_\theta-1]} \mu^{\delta-\delta_R} \sum_{k=0}^{d-2} R_k^{*[0]} \mu^k + R_{d-1}^{*[0]} \mu^{-\delta_R} \sum_{h=0}^{d+\delta-2} \theta^{[h-\delta_\theta]} \mu^h + \mu^{-1} R_{d+\delta_R-2}^* \tag{30}$$

In general, $$R_g^* = x_{g+\delta-\delta_R-\delta_X} y_{g+\delta-\delta_R-\delta_Y} \mu^{g+2\delta-\delta_X-\delta_Y-2\delta_R} +$$

$$x_{g+\delta-\delta_R-\delta_X} \mu^{\delta-\delta_X-\delta_R} \sum_{j=0}^{g+\delta-\delta_R-1} y_{j-\delta_Y} \mu^{j-\delta_Y} +$$

$$y_{g+\delta-\delta_R-\delta_Y} \mu^{\delta-\delta_Y-\delta_R} \sum_{i=0}^{g+\delta-\delta_R-1} x_{i-\delta_X} \mu^{i-\delta_X} +$$

$$\theta^{[g+\delta-\delta_R-\delta_\theta]} R_{g-\delta_R}^{*[0]} \mu^{g+\delta-\delta_\theta-2\delta_R} +$$

$$\theta^{[g+\delta-\delta_R-\delta_\theta]} \mu^{\delta-\delta_R} \sum_{k=0}^{g-\delta_R-1} R_k^{*[0]} \mu^k +$$

$$R_{g-\delta_R}^{*[0]} \mu^{-\delta_R} \sum_{h=0}^{g+\delta-\delta_R-1} \theta^{[h-\delta_\theta]} \mu^h + \mu^{-1} R_{g-1}^* \text{ for } 0 \le g \le d+\delta$$ (31)

This recurrence describes in general the finite field multiplication operation in which all operands are fed serially and the output is also obtained serially.

Equation (31) is a novel description of the multiplication operation. It formulates the two stages of the field multiplication, namely (i) the operand multiplication and (ii) the finite field reduction, as a serial-serial computation.

2. A Particular Implementation of a Serial-Serial GF(p) Multiplier

One embodiment of equation 31 is shown in this section for GF(p). This architecture is not the only possible implementation of equation 31. It is used to illustrate how it can be implemented in a serial-serial fashion.

As previously mentioned, in GF(p), G(μ) will denote the modulus M while μ will denote the radix $2^r$. Setting $\delta_X=\delta_Y=0$, $\delta_\theta=\delta_R=1$ and noting that the product of any two digits consists of two digits, i.e.

$$a_i b_j = [a_i b_j]_H 2^r + [a_i b_j]_L$$ (32)

Equation (31) can be rewritten in GF(p) as follows.

$$R_g^* = ([x_g y_g]_H 2^r + [x_g y_g]_L) 2^{gr} +$$ (33)

$$\sum_{j=0}^{g-1} ([x_g y_j]_H 2^r + [x_g y_j]_L) 2^{jr} + \sum_{i=0}^{g-1} ([x_i y_g]_H 2^r + [x_i y_g]_L) 2^{ir} +$$

$$([R_{g-1}^{*[0]} \theta^{[g-1]}]_H 2^r + [R_{g-1}^{*[0]} \theta^{[g-1]}]_L) 2^{(g-1)r} +$$

$$\sum_{k=0}^{g-2} ([R_k^{*[0]} \theta^{[g-1]}]_H 2^r + [R_k^{*[0]} \theta^{[g-1]}]_L) 2^{kr} +$$

$$\sum_{h=0}^{g-2} ([R_{g-1}^{*[0]} \theta^{[h]}]_H 2^r + [R_{g-1}^{*[0]} \theta^{[h]}]_L) 2^{hr} + 2^{-r} R_{g-1}^*$$

The maximum significance in $R_g^*$ is $2^{(g+1)r}$ (except when g=d, where the maximum significance will be $2^{gr}$). Hence, $R_g^*$ will have (g+2) digits at most of which the higher will be always limited to 1-bit, i.e. its value will be at most 1. Moreover, $R_d^*$ (the final result) will be only one bit longer than the word length, which is a common feature in the output of least-to-most finite field multiplication algorithms. Then, equation (33) can be rewritten as $$\sum_{l=0}^{g+1} R_g^{*[l]} 2^{lr} = ([x_g y_g]_H 2^r + [x_g y_g]_L) 2^{gr} +$$ (34)

$$\sum_{j=0}^{g-1} ([x_g y_j]_H 2^r + [x_g y_j]_L) 2^{jr} + \sum_{i=0}^{g-1} ([x_i y_g]_H 2^r + [x_i y_g]_L) 2^{ir} +$$

$$([R_{g-1}^{*[0]} \theta^{[g-1]}]_H 2^r + [R_{g-1}^{*[0]} \theta^{[g-1]}]_L) 2^{(g-1)r} +$$

$$\sum_{k=0}^{g-2} ([R_k^{*[0]} \theta^{[g-1]}]_H 2^r + [R_k^{*[0]} \theta^{[g-1]}]_L) 2^{kr} +$$

$$\sum_{h=0}^{g-2} ([R_{g-1}^{*[0]} \theta^{[h]}]_H 2^r + [R_{g-1}^{*[0]} \theta^{[h]}]_L) 2^{hr} + 2^{-r} R_{g-1}^*$$

Using equation (34), a basic serial-serial finite field multiplier can be built. The block diagram of that multiplier, in which each cell works with a single significance at any given cycle, is shown in FIG. 2.

Each cell has five inputs and one output. Four of the five inputs are the broadcast lines while the fifth is the sum digit of the next higher cell. Meanwhile, each cell stores its carry digit and the higher digits of the products to be used in the next iteration. The function of each cell can be directly obtained by manipulating equation (34). Based on the assumption that cell s will store the values of $x_s$, $y_s$, $\theta^{[s]}$ and $R_s^{*[0]}$, it is clear that at the $i^{th}$ cycle, only the first $i^{th}$ cells will be operational. Based on equation (34), cell s has one of five operation modes based on the iteration index g:

1. If s>g, then cell s would be idle.
2. If s=g, then cell s would accumulate the term of significance $2^{gr}$ in equation (34), which is $[x_g y_g]_L$, meaning the function of the cell can be defined as:

$$[R_g^{*[s]}]_{carry} 2^r + [R_g^{*[s]}]_{sum} = [x_g y_g]_L$$ (35)

In addition, it will store $x_g$ and $y_g$ as its $x_s$ and $y_s$, respectively.

3. If s=g−1, then the cell s would calculate the terms of significance $2^{g-1}$ in equation (34).

$$[R_g^{*[s]}]_{carry} 2^r + [R_g^{*[s]}]_{sum} = [x_s y_g]_L + [x_g y_s]_L + [R_{g-1}^{*[0]} \theta^{[g-1]}]_L + [x_{g-1} y_{g-1}]_H$$ (36)

In addition, it will store $R_{g-1}^{*[0]}$ and $\theta^{[g-1]}$ as its $R_s^{*[0]}$ and $\theta^{[s]}$, respectively.

4. If s=g−2, then the cell s would calculate the terms of significance $2^{g-2}$.

$$[R_g^{*[s]}]_{carry} 2^r + [R_g^{*[s]}]_{sum} =$$ (37)
$$[x_s y_g]_L + [x_g y_s]_L + [R_s^{*[0]} \theta^{[g-1]}]_L + [R_{g-1}^{*[0]} \theta^{[s]}]_L + [x_s y_{g-1}]_H +$$
$$[x_{g-1} y_s]_H + [R_{g-2}^{*[0]} \theta^{[g-2]}]_H [R_{g-1}^{*[s]}]_{carry} + [R_{g-1}^{*[s+1]}]_{sum}$$

5. If s<g−2, then the cell s would calculate the terms of significance $2^s$. {in general}

$$[R_g^{*[s]}]_{carry} 2^r + [R_g^{*[s]}]_{sum} = [x_s y_g]_L + [x_g y_s]_L +$$ (38)
$$[R_s^{*[0]} \theta^{[g-1]}]_L + [R_{g-1}^{*[0]} \theta^{[s]}]_L + [x_s y_{g-1}]_H + [x_{g-1} y_s]_H +$$
$$[R_s^{*[0]} \theta^{[g-2]}]_H + [R_{g-2}^{*[0]} \theta^{[s]}]_H + [R_{g-1}^{*[s]}]_{carry} + [R_{g-1}^{*[s+1]}]_{sum}$$

FIG. 3 shows the general structure for the finite field multiplier cell.

As can be seen only serial communications of the input and output operands are used. Also, it is clear that the first digit of the partial products is obtained after only one cycle.

3. Serial-Serial Finite Field Reduction

The same derivation illustrated above can be used to develop a serial-serial finite field reduction structure, i.e. a structure that reduces a given 2d-digits quantity with respect to a given finite field. In such case, the only inputs to the structure would be the quantity to be reduced, the reduction term and feedback digits of the result, as shown in the following formula. Moreover, the cell used will be the same except of the part that handles the digits of X and Y, which is no longer required. This reduces the cell by two multipliers, two registers and a multiplexer.

4. An Improved Implementation Using d/2 Cells

One possible enhancement of the structure is described here based on the transformation of time-space mappings. This is effectively another embodiment of equation (31).

The serial-serial finite field multiplier described above used d cells to multiply two d-digit numbers. The number of required cells can be reduced to d/2 without changing the internal design of the cell. This can be achieved for normal integer multiplication by exploiting the fact that the cells d/2, d/2+1, . . . up to d−1 are idle half of the cycles.

In this invention, we show that the same feature exists for field multiplication. As an example, Table 1 shows the multiplication of two 4-digit numbers. As can be seen, when the field multiplication is formulated as a serial-serial computation as in equation (31), again half the cells remain idle for half of the cycles.

Combining this fact with the fact that the multipliers of the lower d/2 cells are idle in the last d cycles, it can be seen that the higher d/2 cells are basically redundant. Table 2 shows how the same computation would look like on 2 cells only.

TABLE 1

The Result Accumulation in A Serial-Serial Finite field Multiplier (d cells)

| Cycle | Result | Cell 0 | Cell 1 | Cell 2 | Cell 3 |
|---|---|---|---|---|---|
| 0 | $R_0^{*[0]}$ | $x_0y_0$ | | | |
| 1 | $R_1^{*[0]}$ | $x_0y_1 + x_1y_0 + R_0^{*[0]}\theta^{[0]}$ | $x_1y_1$ | | |
| 2 | $R_2^{*[0]}$ | $x_0y_2 + x_2y_0 + R_0^{*[0]}\theta^{[1]} + R_1^{*[0]}\theta^{[0]}$ | $x_1y_2 + x_2y_1 + R_1^{*[0]}\theta^{[1]}$ | $x_2y_2$ | |
| 3 | $R_3^{*[0]}$ | $x_0y_3 + x_3y_0 + R_0^{*[0]}\theta^{[2]} + R_2^{*[0]}\theta^{[0]}$ | $x_1y_2 + x_2y_1 + R_1^{*[0]}\theta^{[2]} + R_2^{*[0]}\theta^{[1]}$ | $x_2y_3 + x_3y_2 + R_2^{*[0]}\theta^{[2]}$ | $x_3y_3$ |
| 4 | $R_4^{*[0]}$ | $R_0^{*[0]}\theta^{[3]} + R_3^{*[0]}\theta^{[0]}$ | $R_1^{*[0]}\theta^{[3]} + R_3^{*[0]}\theta^{[1]}$ | $R_2^{*[0]}\theta^{[3]} + R_3^{*[0]}\theta^{[2]}$ | $R_3^{*[0]}\theta^{[3]}$ |
| 5 | $R_4^{*[1]}$ | | | | |
| 6 | $R_4^{*[2]}$ | | | | |
| 7 | $R_4^{*[3]}$ | | | | |
| 8 | $R_4^{*[4]}$ | | | | |

TABLE 2

The Result Accumulation in A Serial-Serial Finite field Multiplier (d/2 cells)

| Cycle | Result | Cell 0 | Cell 1 |
|---|---|---|---|
| 0 | $R_0^{*[0]}$ | $x_0y_0$ | |
| 1 | $R_1^{*[0]}$ | $x_0y_1 + x_1y_0 + R_0^{*[0]}\theta^{[0]}$ | $x_1y_1$ |
| 2 | $R_2^{*[0]}$ | $x_0y_2 + x_2y_0 + R_0^{*[0]}\theta^{[1]} + R_1^{*[0]}\theta^{[0]}$ | $x_1y_2 + x_2y_1 + R_1^{*[0]}\theta^{[1]}$ |
| 3 | $R_3^{*[0]}$ | $x_0y_3 + x_3y_0 + R_0^{*[0]}\theta^{[2]} + R_2^{*[0]}\theta^{[0]}$ | $x_1y_2 + x_2y_1 + R_1^{*[0]}\theta^{[2]} + R_2^{*[0]}\theta^{[1]}$ |
| 4 | $R_4^{*[0]}$ | $x_2y_2 + R_0^{*[0]}\theta^{[3]} + R_3^{*[0]}\theta^{[0]}$ | $R_1^{*[0]}\theta^{[3]} + R_3^{*[0]}\theta^{[1]}$ |
| 5 | $R_4^{*[1]}$ | $x_2y_3 + x_3y_2 + R_2^{*[0]}\theta^{[2]}$ | $x_3y_3$ |
| 6 | $R_4^{*[2]}$ | $R_2^{*[0]}\theta^{[3]} + R_3^{*[0]}\theta^{[2]}$ | $R_3^{*[0]}\theta^{[3]}$ |
| 7 | $R_4^{*[3]}$ | | |
| 8 | $R_4^{*[4]}$ | | |

Nonetheless, such configuration requires the higher halves of X, Y, θ and half of the truncated resulting bits to be supplied twice, which can be easily achieved by buffering them for d/2 cycles. This change needs to be done in order to reduce the multiplier area by ~50% as shown in FIG. 4.

5. Increasing the Utilization through Operation Multiplexing

In the previous section, the concept of utilizing idle cells by relocating the operations was introduced to enhance the area efficiency of the multiplier by reducing the number of required cells by 50%. The same concept can be generalized for higher gain in terms of area and time.

As can be noted by comparing the operations in Tables 1 and 2, the digits in the second half of the operand words are relocated to reduce the number of cells. This involves supplying these digits twice, which is achieved by using a d/2 shift register. The same concept can be applied to the second half, i.e. splitting it into two halves and supplying the last half twice. Although this will not reduce the number of required cells, it will result in a better utilization of the multiplier cells, as shown in Table 3.

TABLE 3

The Result Accumulation in a Serial-Serial Modular Multiplier after (d/2 cells)

| Cycle | Result | Cell 0 | Cell 1 |
|---|---|---|---|
| 0 | $R_0^{*[0]}$ | $x_0y_0$ | |
| 1 | $R_1^{*[0]}$ | $x_0y_1 + x_1y_0 + R_0^{*[0]}\theta^{[0]}$ | $x_1y_1$ |
| 2 | $R_2^{*[0]}$ | $x_0y_2 + x_2y_0 + R_0^{*[0]}\theta^{[1]} + R_1^{*[0]}\theta^{[0]}$ | $x_1y_2 + x_2y_1 + R_1^{*[0]}\theta^{[1]}$ |
| 3 | $R_3^{*[0]}$ | $x_0y_3 + x_3y_0 + R_0^{*[0]}\theta^{[2]} + R_2^{*[0]}\theta^{[0]}$ | $x_1y_3 + x_3y_1 + R_1^{*[0]}\theta^{[2]} + R_2^{*[0]}\theta^{[1]}$ |
| 4 | $R_4^{*[0]}$ | $x_2y_2 + R_0^{*[0]}\theta^{[3]} + R_3^{*[0]}\theta^{[0]}$ | $R_1^{*[0]}\theta^{[3]} + R_3^{*[0]}\theta^{[1]}$ |

TABLE 3-continued

The Result Accumulation in a Serial-Serial Modular Multiplier after (d/2 cells)

| Cycle | Result | Cell 0 | Cell 1 |
|---|---|---|---|
| 5 | $R_4^{*[1]}$ | $x_2y_3 + x_3y_2 + R_2^{*[0]}\theta^{[2]}$ | |
| 6 | $R_4^{*[2]}$ | $x_3y_3 + R_2^{*[0]}\theta^{[3]} + R_3^{*[0]}\theta^{[2]}$ | | tiplexing achieved. On one extreme, if the number of cells of the original multiplier is doubled, a fully concurrent operation can be achieved since the multiplier will perform like two separate multipliers with no cells in common. On the other extreme, if no cells are added, all cells will be common to both multipliers and the multiplexing will be minimal. Table 4 shows a compromise between the two extremes in which d/4 cells are added, i.e. the total number of cells becomes 3d/4. This results in d/4 cells overlapping and ~1.5 gain in the throughput.

TABLE 4

Multiplexing three multiplication operations on a serial-serial multiplier (3d/4 cells)

| Cycle | Result | Cell 0 (mul1) | Cell 1 (common) | Cell 0 (mul2) | Result | Cycle |
|---|---|---|---|---|---|---|
| 0 | $R_0^{*[0]}$ | $x_0y_0$ | | | | |
| 1 | $R_1^{*[0]}$ | $x_0y_1 + x_1y_0 + R_0^{*[0]}\theta^{[0]}$ | $x_1y_1$ | | | |
| 2 | $R_2^{*[0]}$ | $x_0y_2 + x_2y_0 + R_0^{*[0]}\theta^{[1]} + R_1^{*[0]}\theta^{[0]}$ | $x_1y_2 + x_2y_1 + R_1^{*[0]}\theta^{[1]}$ | | | |
| 3 | $R_3^{*[0]}$ | $x_0y_3 + x_3y_0 + R_0^{*[0]}\theta^{[2]} + R_2^{*[0]}\theta^{[0]}$ | $x_1y_3 + x_3y_1 + R_1^{*[0]}\theta^{[2]} + R_2^{*[0]}\theta^{[1]}$ | | | |
| 4 | $R_4^{*[0]}$ | $x_2y_2 + R_0^{*[0]}\theta^{[3]} + R_3^{*[0]}\theta^{[0]}$ | $R_1^{*[0]}\theta^{[3]} + R_3^{*[0]}\theta^{[1]}$ | | | |
| 5 | $R_4^{*[1]}$ | $x_2y_3 + x_3y_2 + R_2^{*[0]}\theta^{[2]}$ | | $x_0y_0$ | $R_0^{*[0]}$ | 0 |
| 6 | $R_4^{*[2]}$ | $x_3y_3 + R_2^{*[0]}\theta^{[3]} + R_3^{*[0]}\theta^{[2]}$ | $x_1y_1$ | $x_0y_1 + x_1y_0 + R_0^{*[0]}\theta^{[0]}$ | $R_1^{*[0]}$ | 1 |
| 7 | $R_4^{*[3]}$ | $R_3^{*[0]}\theta^{[3]}$ | $x_1y_2 + x_2y_1 + R_1^{*[0]}\theta^{[1]}$ | $x_0y_2 + x_2y_0 + R_0^{*[0]}\theta^{[1]} + R_1^{*[0]}\theta^{[0]}$ | $R_2^{*[0]}$ | 2 |
| 8 | $R_4^{*[4]}$ | | $x_1y_3 + x_3y_1 + R_1^{*[0]}\theta^{[2]} + R_2^{*[0]}\theta^{[1]}$ | $x_0y_3 + x_3y_0 + R_0^{*[0]}\theta^{[2]} + R_2^{*[0]}\theta^{[0]}$ | $R_3^{*[0]}$ | 3 |
| | | | $R_1^{*[0]}\theta^{[3]} + R_3^{*[0]}\theta^{[1]}$ | $x_2y_2 + R_0^{*[0]}\theta^{[3]} + R_3^{*[0]}\theta^{[0]}$ | $R_4^{*[0]}$ | 4 |
| 0 | $R_0^{*[0]}$ | $x_0y_0$ | | $x_2y_3 + x_3y_2 + R_2^{*[0]}\theta^{[2]}$ | $R_4^{*[1]}$ | 5 |
| 1 | $R_1^{*[0]}$ | $x_0y_1 + x_1y_0 + R_0^{*[0]}\theta^{[0]}$ | $x_1y_1$ | $x_3y_3 + R_2^{*[0]}\theta^{[3]} + R_3^{*[0]}\theta^{[2]}$ | $R_4^{*[2]}$ | 6 |
| 2 | $R_2^{*[0]}$ | $x_0y_2 + x_2y_0 + R_0^{*[0]}\theta^{[1]} + R_1^{*[0]}\theta^{[0]}$ | $x_1y_2 + x_2y_1 + R_1^{*[0]}\theta^{[1]}$ | $R_3^{*[0]}\theta^{[3]}$ | $R_4^{*[3]}$ | 7 |
| 3 | $R_3^{*[0]}$ | $x_0y_3 + x_3y_0 + R_0^{*[0]}\theta^{[2]} + R_2^{*[0]}\theta^{[0]}$ | $x_1y_3 + x_3y_1 + R_1^{*[0]}\theta^{[2]} + R_2^{*[0]}\theta^{[1]}$ | | $R_4^{*[4]}$ | 8 |
| 4 | $R_4^{*[0]}$ | $x_2y_2 + R_0^{*[0]}\theta^{[3]} + R_3^{*[0]}\theta^{[0]}$ | $R_1^{*[0]}\theta^{[3]} + R_3^{*[0]}\theta^{[1]}$ | | | |
| 5 | $R_4^{*[1]}$ | $x_2y_3 + x_3y_2 + R_2^{*[0]}\theta^{[2]}$ | | | | |
| 6 | $R_4^{*[2]}$ | $x_3y_3 + R_2^{*[0]}\theta^{[3]} + R_3^{*[0]}\theta^{[2]}$ | | | | |
| 7 | $R_4^{*[3]}$ | $R_3^{*[0]}\theta^{[3]}$ | | | | |
| 8 | $R_4^{*[4]}$ | | | | | |

TABLE 3-continued

The Result Accumulation in a Serial-Serial Modular Multiplier after (d/2 cells)

| Cycle | Result | Cell 0 | Cell 1 |
|---|---|---|---|
| 7 | $R_4^{*[3]}$ | $R_3^{*[0]}\theta^{[3]}$ | |
| 8 | $R_4^{*[4]}$ | | |

This can be repetitively applied until the last relocated half becomes only one digit. This requires some digits to be supplied more than once. This can be achieved by using a set of shift registers of different lengths at the inputs. Clearly, the maximum total size of these shift registers is d−1. Another way is to have some feedback connections on the d/2 shift register. Both solutions are shown in FIG. 5.

The idle cells that resulted from relocation are useful when multiplexing more than one operation on the same multiplier. This can be achieved by feeding the operands of the next operation from the other side to utilize the idle cells. Table 4 shows an example of multiplexing operations on a serial-serial multiplier.

There is a trade-off between the number of cells required to perform the multiplexing of operations and the level of mul- 6. A Systolic Implementation of GF(p) Multiplier One possible improvement and another embodiment for equation (31), is given in this section based on the application of the techniques of systolic arrays.

It is possible to make the design systolic by transforming each other delay to the broadcast lines. Then, each cell of the systolic array will encapsulate two multiplier cells. The adders of these two cells can be combined for more efficient operation. FIGS. 6 and 7 show the resulting structure and cell, respectively.

7. A Pipelined Implementation of GF(p) Multiplier

Another possible improvement of the structure is discussed in this section to increase the clock frequency through pipelining. Again, this is another embodiment which is based on equation (31).

The existence of the parameter $\delta_R$ in equation (31) indicates the possibility of delaying the correction for a number of cycles, which can help in pipelining the multiplier. When $\delta_R=1$, the maximum possible number of stages without breaking the dependency would be 2. By increasing the value of $\delta_R$, the dependency is relaxed since $R_g^*$ needs only the correction of $R_{g-\delta_R}^*$. Hence, the number of possible pipeline stages will increase. FIG. 8 illustrates this for $\delta_R=4$.

While pipelining the multiplier cell, the pipelining stages can be applied to either digit multipliers or the first two digit adders of the cell architecture. Pipelining can also be used to multiplex several multiplication operations on the same multiplier at the same time.

8. A Design Trade-off Between the Number of Digit Multipliers and the Multiplication Time In this section, a variety of cell architectures are discussed which give different trade-offs between time and area (and hence power consumption). These obviously result in different embodiments which are based on equation (31).

There exists a design trade-off between the number of digit multipliers needed in each cell and the number of cycles needed to perform multiplication. Since the computation in each consists of four digit multiplications, the following relationship holds between the number of digit multipliers, D, that are available in each cell, and the number of cycles, c, needed to compute the four digit multipliers:

$$Dc = 4 \tag{39}$$

In addition to the difference in performance, different implementations have different hardware and power requirements. In particular, the less the number of digit multipliers used inside each cell, the less the needed bus width. For example, if only one digit multiplier is used, then only one digit-wide bus line will be enough to transfer all the required operands.

9. Multiplier Cell Realization

The digit multipliers and digit adders used in the cells of the structures described in the previous sections can be realized using any of the available technologies and algorithms to reduce time, hardware or power dissipation. This includes, but is not limited to, carry-save arithmetic, signed-digit arithmetic in addition to redundant arithmetic in general.

Each cell realization would effectively lead to a different embodiment of equation (31).

10. Scalable Finite Field Multipliers—Basic Equation

In this section, it is shown that all the structures based on equation (31) are scalable.

Noting that $\theta^{[-1]} = R_{-1}^{[0]} = 0$, the summations in equation (24) can be partitioned into blocks as follows $$R = \mu^{-d-\delta_R} \left( \sum_{i=0}^{d+\delta-1} x_{i-\delta_X} \mu^{i-\delta_X} \sum_{j=0}^{d+\delta-1} y_{j-\delta_Y} \mu^{j-\delta_Y} + \sum_{h=0}^{d+\delta-1} \theta^{[h-\delta_\theta]} \mu^h \sum_{k=0}^{d-1} R_k^{[0]} \mu^k \right) \tag{40}$$

$$= \mu^{-d-\delta_R} \sum_{\phi=0}^{\frac{d+\delta}{\varepsilon}-1} \sum_{\tau=0}^{\frac{d+\delta}{\varepsilon}-1} \mu^{(\phi+\tau)\varepsilon} \left( \sum_{i=0}^{\varepsilon-1} x_{i-\delta_X+\phi\varepsilon} \mu^{i-\delta_X} \cdot \sum_{j=0}^{\varepsilon-1} y_{j-\delta_Y+\tau\varepsilon} \mu^{j-\delta_Y} + \sum_{h=0}^{\varepsilon-1} \theta^{[h-\delta_\theta+\phi\varepsilon]} \mu^h \cdot \sum_{k=-\delta}^{\varepsilon-\delta-1} R_{k+\tau\varepsilon}^{[0]} \mu^k \right)$$

where $\varepsilon$ represent the block size, while $\phi$ and $\tau$ are the indices to identify each multiplication block. The expression between parentheses in equation (40) is in fact the same as the expression in equations (23), which describes the whole multiplication operation. The summations signified by the outer summation's can be implemented in any way so long as the significance is taken into consideration. One possible implementation to implement the block in a serial-serial fashion, and the equation would look like:

$$R = \mu^{-d-\delta_R} \sum_{\phi=0}^{\frac{d+\delta}{\varepsilon}-1} \sum_{\tau=0}^{\frac{d+\delta}{\varepsilon}-1} \mu^{(\phi+\tau)\varepsilon} \left( R_{\varepsilon-1}^{(\phi,\tau)} \right) \tag{41}$$

where $$R_g^{(\phi,\tau)} = \tag{42}$$

$$x_{g-\delta_X+\phi\varepsilon} y_{g-\delta_Y+\tau\varepsilon} \mu^{2g-\delta_X-\delta_Y} + x_{g-\delta_X+\phi\varepsilon} \mu^{g-\delta_X} \sum_{j=0}^{g-1} y_{j-\delta_Y+\tau\varepsilon} \mu^{j-\delta_Y} +$$

$$y_{g-\delta_Y+\tau\varepsilon} \mu^{g-\delta_Y} \sum_{i=0}^{g-1} x_{i-\delta_X+\phi\varepsilon} \mu^{i-\delta_X} +$$

$$\theta^{[g-\delta_\theta+\phi\varepsilon]} R_{g-\delta+\tau\varepsilon}^{[0]} \mu^{2g-\delta} + \theta^{[g-\delta_\theta+\phi\varepsilon]} \mu^g \sum_{k=-\delta}^{g-1-\delta} R_{k+\tau\varepsilon}^{[0]} \mu^k +$$

$$R_{g-\delta+\tau\varepsilon}^{[0]} \mu^{g-\delta} \sum_{h=0}^{g-1} \theta^{[h-\delta_\theta+\phi\varepsilon]} \mu^h + \mu^{-1} R_{g-1}^{(\phi,\tau)} \text{ for } 0 \leq g \leq \varepsilon - 1$$

It should be noted that implementing the outer summations as a serial-serial accumulation is also novel. Equations (41) and (42) imply that the whole multiplication process can be defined as a set of multiplications of sub-words.

It should also be noted that while implementing a scalable finite field multiplier, it is possible to map the blocks to one or more block multipliers. The blocks can be evaluated and accumulated in any order provided that the accumulation mechanism takes care of the respective significance of the blocks. Also, the internal structure of each block multiplier is flexible itself, i.e. any multiplication algorithm can be used to implement the block multiplier, including serial-serial multiplication as already illustrated.

11. An Implementation of a Scalable Finite Field Multiplier

As an embodiment of equations (41) and (42), a scalable finite field multiplier consists of the following components: a memory, a serial-serial finite field multiplier and a digit-serial adder, as shown in FIG. 9. Operands, which can be of any size regardless of the multiplier size, are stored in the memory. To perform the field multiplication operation, operands are divided into sub-words that match the multiplier size. These sub-words are multiplied independently according to equation (42). Then, the results of these multiplications are accumulated according to equation (41) using the digit-serial adder. Furthermore, since a serial-serial multiplier and a digit-serial adder are used, data is transferred between all components one digit at a time. Hence, all buses are only one-digit wide.

This structure is particularly useful for situations where area is scarce, like on a smart card. For further reduction in area, and in order to support arbitrary precision requirements, the accumulation of partial result can be implemented in software.

12. Realizations of a GF($p^m$) Serial-Serial Multiplier

As indicated in section C-1, equation (31) is also applicable to GF($p^m$).

A GF($p^m$) serial-serial multiplier can be obtained using equation (31) by applying the same steps as done for GF(p). In fact, the cells of such multiplier will have the same structure as the abovementioned cells. The only difference will be in the arithmetic elements used in building the cell. In the case of GF($p^m$), all the arithmetic elements, i.e. digit multipliers and adders should be operating modulo-p. It is worth noting in this case that there are no carries from significance to the next due to module p operation, and hence the cell should be modified accordingly.

Moreover, any resultant serial-serial GF($p^m$) multiplier can be made systolic, pipelined and made scalable by the same methodology applied above for GF(p) multiplication.

13. Universal Architecture for Finite Field Multipliers

The multiplication architecture is the same for all fields as can be deduced from the above sections. The architecture of the basic cell is also the same for all fields. The difference is in the functionality of the basic arithmetic elements in the cell. By designing arithmetic elements that can support the arithmetic operations of different fields, a universal cell, and hence a universal multiplier, can be built.

14. A Most-to-Least Serial-Serial GF($p^m$) Multiplier

Another embodiment of the invention is given in this section based on most-to-least significant digit computation.

Most-to-least Multiplication can be achieved by correcting for the most-significant digit of the partial sum, rather than the least-significant one. The left of the operation is in essence very similar to the least-to-most finite field multiplication, as illustrated in equation (43).

$$R = \left( \sum_{i=0}^{d+\delta-1} x_{d+\delta_X-i-1} \mu^{d+\delta_X-i-1} \sum_{j=0}^{d+\delta-1} y_{d+\delta_Y-j-1} + \sum_{h=0}^{d+\delta-1} \theta^{[d+\delta_\theta-h-1]} \mu^{d-h-1} \sum_{k=0}^{d-1} R_k^{[k]} \mu^k \right)^{[0:d+\delta-1]} \quad (43)$$

where $$\theta = \mu^\delta \theta \bmod G(\alpha) \quad (44)$$

In particular, for GF($p^m$), since there is no carry propagation between digits, the serial-serial most-to-least implementation of a GF($p^m$) is straight forward based on the abovementioned least-to-most implementation. As a recurrence, most-to-least serial-serial field multiplication would look like:

$$R_{d+\delta} = \left( \sum_{i=0}^{d+\delta-1} x_{d+\delta_X-i-1} \mu^{d+\delta_X-i-1} \sum_{j=0}^{d+\delta-1} y_{d+\delta_Y-j-1} \mu^{d+\delta_Y-j-1} + \sum_{h=0}^{d+\delta-1} \theta^{[d+\delta_\theta-h-1]} \mu^{d-h-1} \sum_{k=0}^{d-1} R_k^{[k]} \mu^k \right)^{[0:d+\delta-1]} \quad (45)$$

$$= \left( \begin{array}{l} x_{\delta_X-\delta} y_{\delta_Y-\delta} \mu^{\delta_X+\delta_Y-2\delta} + x_{\delta_X-\delta} \mu^{\delta_X-\delta} \sum_{j=0}^{d+\delta-1} y_{d+\delta_Y-j-1} \mu^{d+\delta_Y-j-1} + \\ y_{\delta_Y-\delta} \mu^{\delta_Y-\delta} \sum_{i=0}^{d+\delta-2} x_{d+\delta_X-i-1} \mu^{d+\delta_X-i-1} + \sum_{i=0}^{d+\delta-2} x_{d+\delta_X-i-1} \mu^{d+\delta_X-i-1} \sum_{j=0}^{d+\delta-2} y_{d+\delta_Y-j-1} \mu^{d+\delta_Y-j-1} + \\ \theta^{[\delta_\theta-\delta]} R_{d-1}^{[d-1]} \mu^{d-\delta-1} + \theta^{[\delta_\theta-\delta]} \mu^{-\delta} \sum_{k=0}^{d-2} R_k^{[k]} \mu^k + R_{d-1}^{[d-1]} \mu^{d-1} \sum_{h=0}^{d+\delta-2} \theta^{[d+\delta_\theta-h-1]} \mu^{d-h-1} + \\ \sum_{h=0}^{d+\delta-2} \theta^{[d+\delta_\theta-h-1]} \mu^{d-h-1} \sum_{k=0}^{d-2} R_k^{[k]} \mu^k \end{array} \right)^{[0:d+\delta-1]}$$

$$= x_{\delta_X-\delta} y_{\delta_Y-\delta} \mu^{\delta_X+\delta_Y-2\delta} + x_{\delta_X-\delta} \mu^{\delta_X-\delta} \sum_{j=0}^{d+\delta-2} y_{d+\delta_Y-j-1} \mu^{d+\delta_Y-j-1} + y_{\delta_Y-\delta} \mu^{\delta_Y-\delta} \sum_{i=0}^{d+\delta-2} x_{d+\delta_X-i-1} \mu^{d+\delta_X-i-1} + \theta^{[\delta_\theta-\delta]} R_{d-1}^{[d-1]} \mu^{d-\delta-1} +$$

$$\sum_{h=0}^{d+\delta-2} \theta^{[d+\delta_\theta-h-1]} \mu^{d-h-1} + \mu R_{d+\delta-1} \theta^{[\delta_\theta-\delta]} \mu^{-\delta} \sum_{k=0}^{d-2} R_k^{[k]} \mu^k + R_{d-1}^{[d-1]} \mu^{d-1}$$

In general, $$R_g = \left(\sum_{i=0}^{g-1} x_{d+\delta_X-i-1}\mu^{d+\delta_X-i-1}\sum_{j=0}^{g-1} y_{d+\delta_Y-j-1}\mu^{d+\delta_Y-j-1} + \sum_{h=0}^{g-1}\theta^{[d+\delta_\theta-h-1]}\mu^{d-h-1}\sum_{k=0}^{g-\delta-1} R_k^{[k]}\mu^k\right)^{[0:g-1]} \quad (46)$$

$$= \begin{pmatrix} x_{d+\delta_X-g}y_{d+\delta_Y-g}\mu^{2(d-g)+\delta_X+\delta_Y} + x_{d+\delta_X-g}\mu^{d+\delta_X-g}\sum_{j=0}^{g-2} y_{d+\delta_Y-j-1}\mu^{d+\delta_Y-j-1} + \\ y_{d+\delta_Y-g}\mu^{d+\delta_Y-g}\sum_{i=0}^{g-2} x_{d+\delta_X-i-1}\mu^{d+\delta_X-i-1} + \sum_{i=0}^{g-2} x_{d+\delta_X-i-1}\mu^{d+\delta_X-i-1}\sum_{j=0}^{g-2} y_{d+\delta_Y-j-1}\mu^{d+\delta_Y-j-1} + \\ \theta^{[d+\delta_\theta-g]}R_{g-\delta-1}^{[g-\delta-1]}\mu^{d-\delta-1} + \theta^{[d+\delta_\theta-g]}\mu^{d-g}\sum_{k=0}^{g-\delta-2} R_k^{[k]}\mu^k + R_{g-\delta-1}^{[g-\delta-1]}\mu^{g-\delta-1}\sum_{h=0}^{g-2}\theta^{[d+\delta_\theta-h-1]}\mu^{d-h-1} + \\ \sum_{h=0}^{g-2}\theta^{[d+\delta_\theta-h-1]}\mu^{d-h-1}\sum_{k=0}^{g-\delta-2} R_k^{[k]}\mu^k \end{pmatrix}^{[0:g-1]}$$

$$= x_{d+\delta_X-g}y_{d+\delta_Y-g}\mu^{2(d-g)+\delta_X+\delta_Y} + x_{d+\delta_X-g}\mu^{d+\delta_X-g}\sum_{j=0}^{g-2} y_{d+\delta_Y-j-1}\mu^{d+\delta_Y-j-1} + y_{d+\delta_Y-g}\mu^{d+\delta_Y-g}\sum_{i=0}^{g-2} x_{d+\delta_X-i-1}\mu^{d+\delta_X-i-1} +$$

$$\theta^{[d+\delta_\theta-g]}R_{g-\delta-1}^{[g-\delta-1]}\mu^{d-\delta-1} + \theta^{[d+\delta_\theta-g]}\mu^{d-g}\sum_{k=0}^{g-\delta-2} R_k^{[k]}\mu^k + R_{g-\delta-1}^{[g-\delta-1]}\mu^{g-\delta-1}\sum_{h=0}^{g-2}\theta^{[d+\delta_\theta-h-1]}\mu^{d-h-1} + \mu R_{g-1}$$

where $0 \leq g \leq d + \delta$

15. A Generalized Bi-Directional Equation for Serial-Serial Field Multiplication The equations that describe serial-serial field multiplication can be merged in one equation that can be interpreted in both directions, least-to-most and most-to-least. This can be achieved using a parameter $\rho$ which indicates least-to-most when it is −1 and most-to-least when it is 1, as shown in equation (47).

$$R = \left[\mu^{\frac{\delta_R+d}{2}(\rho-1)}\left(\sum_{i=0}^{d+\delta-1} x_{\rho\left(\frac{d-1}{2}+\delta_X-i\right)+\frac{d-1}{2}}\mu^{\rho\left(\frac{d-1}{2}+\delta_X-i\right)+\frac{d-1}{2}} \cdot \sum_{j=0}^{d+\delta-1} y_{\rho\left(\frac{d-1}{2}+\delta_Y-j\right)+\frac{d-1}{2}}\mu^{\rho\left(\frac{d-1}{2}+\delta_Y-j\right)+\frac{d-1}{2}} + \sum_{h=0}^{d+\delta-1} \theta^{\rho\left(\frac{d-1}{2}+\delta_\theta-h\right)+\frac{d-1}{2}}\mu^{\rho\left(\frac{d-1}{2}-h\right)+\frac{d-1}{2}}\sum_{k=0}^{d-1} R_k^{\left[\frac{k}{2}(\rho+1)\right]}\mu^k\right)\right]^{[0:d+\delta-1]} \quad (47)$$

As a result, the same structure can be used to implement most-to-least computation or least-to-most computation.

16. Hybrid Most-to-Least and Least-to-Most Serial-Serial Field Multiplication It is possible to mix the most-to-least and the least-to-most computation in one formulation when implementing a scalable field multiplication. This would result in the two multiplication algorithms meeting in the middle of the multiplication operation.

FIG. 10 illustrates the time-space mapping of the multiplication and reduction operations of finite field multiplication to achieve inherent serial-serial behavior. It shows the finite field multiplication operation of two operands $X = x_3x_2x_1x_0$ and $Y = y_3y_2y_1y_0$. The multiplication part of the finite field multiplication operation is shown by the hollow circles, while the reduction part is shown by the black circles. The thick lines show the time-space mapping by separating the operations performed in different time cycles. In each of the cycles, each column indicates the operations performed simultaneously on a single cell.

While the invention has been described in connection with its preferred embodiments, it should be recognized that changes and modifications made be made therein without departing from the scope of the appended claims.

What is claimed is:

1. A finite field multiplication/reduction structure in an XZ Elliptic curve cryptographic system for communicating securely over an insecure communication channel of the type which communicates a message from a transmitter to a receiver in which an operand multiplication and a field reduction are formulated as a serial-serial computation, wherein the formula for least-to-most significant digit first multiplication is:

$$R_g^* = x_{g+\delta-\delta_R-\delta_X}y_{g+\delta-\delta_R-\delta_Y}\mu^{g+2\delta-\delta_X-\delta_Y-2\delta_R} + \quad (1)$$

$$x_{g+\delta-\delta_R-\delta_X}\mu^{\delta-\delta_X-\delta_R}\sum_{j=0}^{g+\delta-\delta_R-1} y_{j-\delta_Y}\mu^{j-\delta_Y} +$$

$$y_{g+\delta-\delta_R-\delta_Y}\mu^{\delta-\delta_Y-\delta_R}\sum_{i=0}^{g+\delta-\delta_R-1} x_{i-\delta_X}\mu^{i-\delta_X} +$$

$$\theta^{[g+\delta-\delta_R-\delta_\theta]}R_{g-\delta_R}^{*[0]}\mu^{g+\delta-\delta_\theta-2\delta_R} + \theta^{[g+\delta-\delta_R-\delta_\theta]}\mu^{\delta-\delta_R}\sum_{k=0}^{g-\delta_R-1} R_k^{*[0]}\mu^k +$$

$$R_{g-\delta_R}^{*[0]}\mu^{-\delta_R}\sum_{h=0}^{g+\delta-\delta_R-1}\theta^{[h-\delta_\theta]}\mu^h + \mu^{-1}R_{g-1}^*$$

wherein the formula for most-to-least significant digit first multiplication is:

$$R_g = x_{d+\delta_X - g} y_{d+\delta_Y - g} \mu^{2(d-g)+\delta_X+\delta_Y} + \quad (2)$$

$$x_{d+\delta_X - g} \mu^{d+\delta_X - g} \sum_{j=0}^{g-2} y_{d+\delta_Y - j - 1} \mu^{d+\delta_Y - j - 1} +$$

$$y_{d+\delta_Y - g} \mu^{d+\delta_Y - g} \sum_{i=0}^{g-2} x_{d+\delta_X - i - 1} \mu^{d+\delta_X - i - 1} +$$

$$\theta^{[d+\delta_\theta - g]} R_{g-\delta-1}^{[g-\delta-1]} \mu^{d-\delta-1} + \theta^{[d+\delta_\theta - g]} \mu^{d-g} \sum_{k=0}^{g-\delta-2} R_k^{[k]} \mu^k +$$

$$R_{g-\delta-1}^{[g-\delta-1]} \mu^{g-\delta-1} \sum_{h=0}^{g-2} \theta^{[d+\delta_\theta - h - 1]} \mu^{d-h-1} + \mu R_{g-1}$$

wherein the formula for least-to-most significant digit first reduction is:

$$R_g^* = W^{[g]} + \theta^{[g+\delta-\delta_R-\delta_\theta]} R_{g-\delta_R}^{*[0]} \mu^{g+\delta-\delta_\theta-2\delta_R} + \quad (3)$$

$$\theta^{[g+\delta-\delta_R-\delta_\theta]} \mu^{\delta-\delta_R} \sum_{k=0}^{g-\delta_R-1} R_k^{*[0]} \mu^k +$$

$$R_{g-\delta_R}^{*[0]} \mu^{-\delta_R} \sum_{h=0}^{g+\delta-\delta_R-1} \theta^{[h-\delta_\theta]} \mu^h + \mu^{-1} R_{g-1}^*$$

wherein the formula for most-to-least significant digit first reduction is:

$$R_g = W^{[2d+\delta-g]} + \theta^{[d+\delta_\theta-g]} R_{g-\delta-1}^{[g-\delta-1]} \mu^{d-\delta-1} + \theta^{[d+\delta_\theta-g]} \mu^{d-g} \sum_{k=0}^{g-\delta-2} R_k^{[k]} \mu^k + \quad (4)$$

$$R_{g-\delta-1}^{[g-\delta-1]} \mu^{g-\delta-1} \sum_{h=0}^{g-2} \theta^{[d+\delta_\theta - h - 1]} \mu^{d-h-1} + \mu R_{g-1}$$

wherein $0 \leq g \leq d+\delta$, $x_i$ and $y_i$ are the $i^{th}$ digits of the input operands to be multiplied, $\theta^{[i]}$ is the $i^{th}$ digit of the reduction polynomial, W is the 2d-digits quantity to be reduced and $W^{[g]}$ is the $g^{th}$ digit of W, and wherein the computation for $d+\delta+1 \leq g \leq 2d+\delta$ is formulated in an identical fashion except that the resultant feedback digits are not fed back but used as the output of the structure.

2. A finite field multiplication/reduction structure in an XZ Elliptic curve cryptographic system for communicating securely over an insecure communication channel of the type which communicates a message from a transmitter to a receiver according to claim 1, wherein any input is fed serially one digit at a time and an output is obtained serially one digit at a time and wherein a digit can consist of one bit or a group of bits.

3. A finite field multiplication/reduction structure in an XZ Elliptic curve cryptographic system for communicating securely over an insecure communication channel of the type which communicates a message from a transmitter to a receiver according to claim 2, which is implemented either as a pure hardware unit, or as a program stored on a computer readable storage device and executed on a digital computer, or a combination of both.

4. A finite field multiplication/reduction structure in an XZ Elliptic curve cryptographic system for communicating securely over an insecure communication channel of the type which communicates a message from a transmitter to a receiver according to claim 3, which is optimized by exploiting different trade-offs that result from varying the digit size.

5. A finite field multiplication/reduction structure in an XZ Elliptic curve cryptographic system for communicating securely over an insecure communication channel of the type which communicates a message from a transmitter to a receiver according to claim 4, wherein the result of each digit multiplication is split into high- and low-significance digits, and wherein least-to-most significant digit first multiplication is implemented according to the formula:

$$R_g^* = ([x_{g+\delta-\delta_X-\delta_R} y_{g+\delta-\delta_Y-\delta_R}]_H \mu + [x_{g+\delta-\delta_X-\delta_R} y_{g+\delta-\delta_Y-\delta_R}]_L) \quad (5)$$

$$\mu^{g+2\delta-\delta_X-\delta_Y-2\delta_R} + \mu^{\delta-\delta_X-\delta_R}$$

$$\sum_{j=0}^{g+\delta-\delta_R-1} ([x_{g+\delta-\delta_X-\delta_R} y_{j-\delta_Y}]_H \mu + [x_{g+\delta-\delta_X-\delta_R} y_{j-\delta_Y}]_L) \mu^{j-\delta_Y} +$$

$$\mu^{\delta-\delta_Y-\delta_R}$$

$$\sum_{i=0}^{g+\delta-\delta_R-1} ([x_{i-\delta_X} y_{g+\delta-\delta_Y-\delta_R}]_H \mu + [x_{i-\delta_X} y_{g+\delta-\delta_Y-\delta_R}]_L) \mu^{i-\delta_X} +$$

$$([\theta^{[g+\delta-\delta_\theta-\delta_R]} R_{g-\delta_R}^{*[0]}]_H \mu + [\theta^{[g+\delta-\delta_\theta-\delta_R]} R_{g-\delta_R}^{*[0]}]_L) \mu^{g+\delta-\delta_\theta-2\delta_R} +$$

$$\mu^{\delta-\delta_R} \sum_{k=0}^{g-\delta_R-1} ([\theta^{[g+\delta-\delta_\theta-\delta_R]} R_k^{*[0]}]_H \mu + [\theta^{[g+\delta-\delta_\theta-\delta_R]} R_k^{*[0]}]_L) \mu^k +$$

$$\mu^{-\delta_R} \sum_{h=0}^{g+\delta-\delta_R-1} ([\theta^{[h-\delta_\theta]} R_{g-\delta_R}^{*[0]}]_H \mu + [\theta^{[h-\delta_\theta]} R_{g-\delta_R}^{*[0]}]_L) \mu^h + \mu^{-1} R_{g-1}^*$$

wherein most-to-least significant digit first multiplication is implemented according to the formula:

$$R_g = ([x_{d+\delta_X-g} y_{d+\delta_Y-g}]_H \mu + [x_{d+\delta_X-g} y_{d+\delta_Y-g}]_L) \mu^{2(d-g)+\delta_X+\delta_Y} + \quad (6)$$

$$\mu^{d+\delta_X-g} \sum_{j=0}^{g-2} ([x_{d+\delta_X-g} y_{d+\delta_Y-j-1}]_H \mu + [x_{d+\delta_X-g} y_{d+\delta_Y-j-1}]_L)$$

$$\mu^{d+\delta_Y-j-1} + \mu^{d+\delta_Y-g} \sum_{i=0}^{g-2} ([x_{d+\delta_X-i-1} y_{d+\delta_Y-g}]_H \mu +$$

$$[x_{d+\delta_X-i-1} y_{d+\delta_Y-g}]_L) \mu^{d+\delta_X-i-1} + ([\theta^{[d+\delta_\theta-g]} R_{g-\delta-1}^{[g-\delta-1]}]_H$$

$$\mu + [\theta^{[d+\delta_\theta-g]} R_{g-\delta-1}^{[g-\delta-1]}]_L) \mu^{d-\delta-1} + \mu^{d-g} \sum_{k=0}^{g-\delta-2} ([\theta^{[d+\delta_\theta-g]} R_k^{[k]}]_H$$

$$\mu + [\theta^{[d+\delta_\theta-g]} R_k^{[k]}]_L)$$

$$\mu^k + \mu^{g-\delta-1} \sum_{h=0}^{g-2} ([\theta^{[d+\delta_\theta-h-1]} R_{g-\delta-1}^{[g-\delta-1]}]_H \mu +$$

$$[\theta^{[d+\delta_\theta-h-1]} R_{g-\delta-1}^{[g-\delta-1]}]_L) \mu^{d-h-1} + \mu R_{g-1}$$

wherein least-to-most significant digit first reduction is implemented according to the formula:

$$R_g^* = \quad (7)$$

$$W^{[g]} + ([\theta^{[g+\delta-\delta_R-\delta_\theta]} R_{g-\delta_R}^{*[0]}]_H \mu + [\theta^{[g+\delta-\delta_R-\delta_\theta]} R_{g-\delta_R}^{*[0]}]_L) \mu^{g+\delta-\delta_\theta-2\delta_R} +$$

$$\mu^{\delta-\delta_R} \sum_{k=0}^{g-\delta_R-1} ([\theta^{[g+\delta-\delta_R-\delta_\theta]} R_k^{*[0]}]_H \mu + [\theta^{[g+\delta-\delta_R-\delta_\theta]} R_k^{*[0]}]_L) \mu^k +$$

$$\mu^{-\delta_R} \sum_{h=0}^{g+\delta-\delta_R-1} ([R_{g-\delta_R}^{*[0]} \theta^{[h-\delta_\theta]}]_H \mu + [R_{g-\delta_R}^{*[0]} \theta^{[h-\delta_\theta]}]_L) \mu^h + \mu^{-1} R_{g-1}^*$$

wherein most-to-least significant digit first reduction is implemented according to the formula:

$$R_g^* = W^{[2d+\delta-g]} + \left(\left[\theta^{[d+\delta_\theta-g]} R_{g-\delta-1}^{[g-\delta-1]}\right]_H \mu + \left[\theta^{[d+\delta_\theta-g]} R_{g-\delta-1}^{[g-\delta-1]}\right]_L\right)\mu^{d-\delta-1} + \qquad (8)$$
$$\mu^{d-g}\sum_{k=0}^{g-\delta-2}\left(\left[\theta^{[d+\delta_\theta-g]} R_k^{[k]}\right]_H \mu + \left[\theta^{[d+\delta_\theta-g]} R_k^{[k]}\right]_L\right)\mu^k +$$
$$\mu^{g-\delta-1}\sum_{h=0}^{g-2}\left(\left[R_{g-\delta-1}^{[g-\delta-1]} \theta^{[d+\delta_\theta-h-1]}\right]_H \mu + \left[R_{g-\delta-1}^{[g-\delta-1]} \theta^{[d+\delta_\theta-h-1]}\right]_L\right)\mu^{d-h-1} +$$
$$\mu R_{g-1}$$

for $0 \leq g \leq d+\delta$, wherein the computation for $d+\delta+1 \leq g \leq 2d+\delta$ is formulated in an identical fashion except that the resultant feedback digits are not fed back but used as the output of the structure.

6. A finite field multiplication/reduction structure in an XZ Elliptic curve cryptographic system for communicating securely over an insecure communication channel of the type which communicates a message from a transmitter to a receiver according to claim 5, wherein the result is divided into digits that are obtained by accumulating digits of the same significance in the right-hand side of the equation, wherein least-to-most significant digit first multiplication is implemented according to the formula:

$$\sum_{l=0}^{g+1} R_g^{*[l]} \mu^l = \left(\left[x_{g+\delta-\delta_X-\delta_R} y_{g+\delta-\delta_Y-\delta_R}\right]_H \mu + \left[x_{g+\delta-\delta_X-\delta_R} y_{g+\delta-\delta_Y-\delta_R}\right]_L\right) \qquad (9)$$
$$\mu^{g+2\delta-\delta_X-\delta_Y-2\delta_R} + \mu^{\delta-\delta_X-\delta_R}$$
$$\sum_{j=0}^{g+\delta-\delta_R-1}\left(\left[x_{g+\delta-\delta_X-\delta_R} y_{j-\delta_Y}\right]_H \mu + \left[x_{g+\delta-\delta_X-\delta_R} y_{j-\delta_Y}\right]_L\right)\mu^{j-\delta_Y} +$$
$$\mu^{\delta-\delta_Y-\delta_R}$$
$$\sum_{i=0}^{g+\delta-\delta_R-1}\left(\left[x_{i-\delta_X} y_{g-\delta_Y-\delta_R}\right]_H \mu + \left[x_{i-\delta_X} y_{g+\delta-\delta_Y-\delta_R}\right]_L\right)\mu^{i-\delta_X} +$$
$$\left(\left[\theta^{[g+\delta-\delta_\theta-\delta_R]} R_{g-\delta_R}^{*[0]}\right]_H \mu + \left[\theta^{[g+\delta-\delta_\theta-\delta_R]} R_{g-\delta_R}^{*[0]}\right]_L\right)\mu^{g+\delta-\delta_\theta-2\delta_R} +$$
$$\mu^{\delta-\delta_R}\sum_{k=0}^{g-\delta_R-1}\left(\left[\theta^{[g+\delta-\delta_\theta-\delta_R]} R_k^{*[0]}\right]_H \mu + \left[\theta^{[g+\delta-\delta_\theta-\delta_R]} R_k^{*[0]}\right]_L\right)\mu^k +$$
$$\mu^{-\delta_R}\sum_{h=0}^{g+\delta-\delta_R-1}\left(\left[\theta^{[h-\delta_\theta]} R_{g-\delta_R}^{*[0]}\right]_H \mu + \left[\theta^{[h-\delta_\theta]} R_{g-\delta_R}^{*[0]}\right]_L\right)\mu^h + \mu^{-1} R_{g-1}^*$$

wherein most-to-least significant digit first multiplication is implemented according to the formula:

$$\sum_{l=0}^{g+1} R_g^{[l]} \mu^l = \qquad (10)$$
$$\left(\left[x_{d+\delta_X-g} y_{d+\delta_Y-g}\right]_H \mu + \left[x_{d+\delta_X-g} y_{d+\delta_Y-g}\right]_L\right)\mu^{2(d-g)+\delta_X+\delta_Y} +$$
$$\mu^{d+\delta_X-g}\sum_{j=0}^{g-2}\left(\left[x_{d+\delta_X-g} y_{d+\delta_Y-j-1}\right]_H \mu + \left[x_{d+\delta_X-g} y_{d+\delta_Y-j-1}\right]_L\right)$$
$$\mu^{d+\delta_Y-j-1} + \mu^{d+\delta_Y-g}$$

-continued
$$\sum_{i=0}^{g-2}\left(\left[x_{d+\delta_X-i-1} y_{d+\delta_Y-g}\right]_H \mu + \left[x_{d+\delta_X-i-1} y_{d+\delta_Y-g}\right]_L\right)$$
$$\mu^{d+\delta_X-i-1} + \left(\left[\theta^{[d+\delta_\theta-g]} R_{g-\delta-1}^{[g-\delta-1]}\right]_H \mu + \left[\theta^{[d+\delta_\theta-g]} R_{g-\delta-1}^{[g-\delta-1]}\right]_L\right)$$
$$\mu^{d-\delta-1} + \mu^{d-g}\sum_{k=0}^{g-\delta-2}\left(\left[\theta^{[d+\delta_\theta-g]} R_k^{[k]}\right]_H \mu + \left[\theta^{[d+\delta_\theta-g]} R_k^{[k]}\right]_L\right)\mu^k +$$
$$\mu^{g-\delta-1}\sum_{h=0}^{g-2}\left(\left[\theta^{[d+\delta_\theta-h-1]} R_{g-\delta-1}^{[g-\delta-1]}\right]_H \mu + \left[\theta^{[d+\delta_\theta-h-1]} R_{g-\delta-1}^{[g-\delta-1]}\right]_L\right)$$
$$\mu^{d-h-1} + \mu R_{g-1}$$

wherein least-to-most significant digit first reduction is implemented according to the formula:

$$\sum_{l=0}^{g+1} R_g^{*[l]} \mu^l = W^{[g]} + \qquad (11)$$
$$\left(\left[\theta^{[g+\delta-\delta_R-\delta_\theta]} R_{g-\delta_R}^{*[0]}\right]_H \mu + \left[\theta^{[g+\delta-\delta_R-\delta_\theta]} R_{g-\delta_R}^{*[0]}\right]_L\right)\mu^{g+\delta-\delta_\theta-2\delta_R} +$$
$$\mu^{\delta-\delta_R}\sum_{k=0}^{g-\delta_R-1}\left(\left[\theta^{[g+\delta-\delta_R-\delta_\theta]} R_k^{*[0]}\right]_H \mu + \left[\theta^{[g+\delta-\delta_R-\delta_\theta]} R_k^{*[0]}\right]_L\right)\mu^k +$$
$$\mu^{-\delta_R}\sum_{h=0}^{g+\delta-\delta_R-1}\left(\left[R_{g-\delta_R}^{*[0]} \theta^{[h-\delta_\theta]}\right]_H \mu + \left[R_{g-\delta_R}^{*[0]} \theta^{[h-\delta_\theta]}\right]_L\right)\mu^h + \mu^{-1} R_{g-1}^*$$

wherein most-to-least significant digit first reduction is implemented according to the formula:

$$\sum_{l=0}^{g+1} R_g^{[l]} \mu^l = \qquad (12)$$
$$W^{[2d+\delta-g]} + \left(\left[\theta^{[d+\delta_\theta-g]} R_{g-\delta-1}^{[g-\delta-1]}\right]_H \mu + \left[\theta^{[d+\delta_\theta-g]} R_{g-\delta-1}^{[g-\delta-1]}\right]_L\right)\mu^{d-\delta-1} +$$
$$\mu^{d-g}\sum_{k=0}^{g-\delta-2}\left(\left[\theta^{[d+\delta_\theta-g]} R_k^{[k]}\right]_H \mu + \left[\theta^{[d+\delta_\theta-g]} R_k^{[k]}\right]_L\right)\mu^k +$$
$$\mu^{g-\delta-1}\sum_{h=0}^{g-2}\left(\left[R_{g-\delta-1}^{[g-\delta-1]} \theta^{[d+\delta_\theta-h-1]}\right]_H \mu + \left[R_{g-\delta-1}^{[g-\delta-1]} \theta^{[d+\delta_\theta-h-1]}\right]_L\right)$$
$$\mu^{d-h-1} + \mu R_{g-1}$$

for $0 \leq g \leq d+\delta$, wherein the computation for $d+\delta+1 \leq g \leq 2d+\delta$ is formulated in an identical fashion except that the resultant feedback digits are not fed back but used as the output of the structure.

7. A finite field multiplication/reduction structure in an XZ Elliptic curve cryptographic system for communicating securely over an insecure communication channel of the type which communicates a message from a transmitter to a receiver according to claim 6, which includes architecture for time-space mappings using d cells to multiply two d-digit numbers and reducing the number of required cells to d/2 without changing the internal design of the cell.

8. A finite field multiplication/reduction structure in an XZ Elliptic curve cryptographic system for communicating securely over an insecure communication channel of the type which communicates a message from a transmitter to a receiver according to claim 7, in which a universal cell is used to build a multiplier that performs field multiplication in different fields such as GF(p), GF($2^m$) and GF($p^m$).

9. A finite field multiplication/reduction structure in an XZ Elliptic curve cryptographic system for communicating securely over an insecure communication channel of the type which communicates a message from a transmitter to a receiver according to claim 8, which is implemented as a systolic array wherein the array consists of similar cells that are laid out in regular pattern with localized inter-cell communication.

10. A finite field multiplication/reduction structure in an XZ Elliptic curve cryptographic system for communicating securely over an insecure communication channel of the type which communicates a message from a transmitter to a receiver according to claim 9, which includes inserting pipelining registers to improve performance by increasing clock frequency, reducing power consumption, and/or ensure localized interconnections.

11. A finite field multiplication/reduction structure in an XZ Elliptic curve cryptographic system for communicating securely over an insecure communication channel of the type which communicates a message from a transmitter to a receiver according to claim 10, in which pipelining registers are used to multiplex more than one multiplication operation on the same structure.

12. A finite field multiplication/reduction structure in an XZ Elliptic curve cryptographic system for communicating securely over an insecure communication channel of the type which communicates a message from a transmitter to a receiver according to claim 11, in which two operations are performed simultaneously in opposite directions on the same serial-serial field multiplication structure.

13. A finite field multiplication/reduction structure in an XZ Elliptic curve cryptographic system for communicating securely over an insecure communication channel of the type which communicates a message from a transmitter to a receiver according to claim 12, wherein different trade-offs between time and area can be provided by allowing for changing the number of digit multipliers in any cell to reduce the area at the cost of increasing the execution time.

14. A finite field multiplication/reduction structure in an XZ Elliptic curve cryptographic system for communicating securely over an insecure communication channel of the type which communicates a message from a transmitter to a receiver according to claim 2, which is scalable, wherein least-to-most significant digit first multiplication/reduction is implemented according to the formula:

$$R = \mu^{-d-\delta_R} \sum_{\phi=0}^{\frac{d+\delta}{\varepsilon}-1} \sum_{\tau=0}^{\frac{d+\delta}{\varepsilon}-1} \mu^{(\phi+\tau)\varepsilon}\left(R_{\varepsilon-1}^{(\phi,\tau)}\right) \quad (13)$$

wherein $R_g^{(\phi,\tau)}$, $0 \leq g \leq \varepsilon-1$, is given for multiplication by the following equation, $$R_g^{(\phi,\tau)} = \quad (14)$$

$$x_{g-\delta_X+\phi\varepsilon} y_{g-\delta_Y+\tau\varepsilon} \mu^{2g-\delta_X-\delta_Y} + x_{g-\delta_X+\phi\varepsilon} \mu^{g-\delta_X} \sum_{j=0}^{g-1} y_{j-\delta_Y+\tau\varepsilon} \mu^{j-\delta_Y} +$$

$$y_{g-\delta_Y+\tau\varepsilon} \mu^{g-\delta_Y} \sum_{i=0}^{g-1} x_{i-\delta_X+\phi\varepsilon} \mu^{i-\delta_X} +$$

-continued $$\theta^{[g-\delta_\theta+\phi\varepsilon]} R_{g-\delta+\tau\varepsilon}^{[0]} \mu^{2g-\delta} + \theta^{[g-\delta_\theta+\phi\varepsilon]} \mu^g \sum_{k=-\delta}^{g-1-\delta} R_{k+\tau\varepsilon}^{[0]} \mu^k +$$

$$R_{g-\delta+\tau\varepsilon}^{[0]} \mu^{g-\delta} \sum_{h=0}^{g-1} \theta^{[h-\delta_\theta+\phi\varepsilon]} \mu^h + \mu^{-1} R_{g-1}^{(\phi,\tau)}$$

wherein $R_g^{(\phi,\tau)}$, $0 \leq g \leq \varepsilon-1$, is given for reduction by the following equation, $$R_g^{(\phi,\tau)} = V^{[g+(\tau+\phi)\varepsilon]} + \theta^{[g-\delta_\theta+\phi\varepsilon]} R_{g-\delta+\tau\varepsilon}^{[0]} \mu^{2g-\delta} +$$

$$\theta^{[g-\delta_\theta+\phi\varepsilon]} \mu^g \sum_{k=-\delta}^{g-1-\delta} R_{k+\tau\varepsilon}^{[0]} \mu^k + R_{g-\delta+\tau\varepsilon}^{[0]} \mu^{g-\delta} \sum_{h=0}^{g-1} \theta^{[h-\delta_\theta+\phi\varepsilon]} \mu^h + \mu^{-1} R_{g-1}^{(\phi,\tau)}$$

wherein most-to-least significant digit first multiplication/reduction is implemented according to the formula:

$$R = \sum_{\phi=0}^{\frac{d+\delta}{\varepsilon}-1} \sum_{\tau=0}^{\frac{d+\delta}{\varepsilon}-1} \mu^{(\phi+\tau)\varepsilon}\left(R_{\varepsilon-1}^{(\phi,\tau)}\right) \quad (16)$$

wherein $R_g^{(\phi,\tau)}$, $0 \leq g \leq \varepsilon-1$, is given for multiplication by the following equation, $$R_g^{(\phi,\tau)} = x_{\varepsilon-1-g+\delta_X+\phi\varepsilon} y_{\varepsilon-1-g+\delta_X+\tau\varepsilon} \mu^{2(\varepsilon-1-g)+\delta_X+\delta_Y} + \quad (16)$$

$$x_{\varepsilon-1-g+\delta_X+\phi\varepsilon} \mu^{\varepsilon-1-g+\delta_X} \sum_{j=0}^{g-1} y_{\varepsilon-1-j+\delta_X+\tau\varepsilon} \mu^{\varepsilon-1-j+\delta_Y} +$$

$$y_{\varepsilon-1-g+\delta_Y+\tau\varepsilon} \mu^{\varepsilon-1-g+\delta_Y} \sum_{i=0}^{g-1} x_{\varepsilon-1-i+\delta_X+\phi\varepsilon} \mu^{\varepsilon-1-i+\delta_X} +$$

$$\theta^{[\varepsilon-1-g+\delta_\theta+\phi\varepsilon]} R_{\varepsilon-1-g+\delta+\tau\varepsilon}^{[0]} \mu^{2(\varepsilon-1-g)+\delta} +$$

$$\theta^{[\varepsilon-1-g+\delta_\theta+\phi\varepsilon]} \mu^{\varepsilon-1-g} \sum_{k=0}^{g-1} R_{\varepsilon-1-k+\delta+\tau\varepsilon}^{[0]} \mu^{\varepsilon-1-k+\delta} +$$

$$R_{\varepsilon-1-g+\delta+\tau\varepsilon}^{[0]} \mu^{\varepsilon-1-g+\delta} \sum_{h=0}^{g-1} \theta^{[\varepsilon-1-h+\delta_\theta+\phi\varepsilon]} \mu^{\varepsilon-1-h} + \mu R_{g-1}^{(\phi,\tau)}$$

wherein $R_g^{(\phi,\tau)}$, $0 \leq g \leq \varepsilon-1$, is given for reduction by the following equation, $$R_g^{(\phi,\tau)} = V^{[\varepsilon-1-g+(\tau+\phi)\varepsilon]} + \theta^{[\varepsilon-1-g+\delta_\theta+\phi\varepsilon]} R_{\varepsilon-1-g+\delta+\tau\varepsilon}^{[0]} \mu^{2(\varepsilon-1-g)+\delta} + \quad (17)$$

$$\theta^{[\varepsilon-1-g+\delta_\theta+\phi\varepsilon]} \mu^{\varepsilon-1-g} \sum_{k=0}^{g-1} R_{\varepsilon-1-k+\delta+\tau\varepsilon}^{[0]} \mu^{\varepsilon-1-k+\delta} +$$

$$R_{\varepsilon-1-g+\delta+\tau\varepsilon}^{[0]} \mu^{\varepsilon-1-g+\delta} \sum_{h=0}^{g-1} \theta^{[\varepsilon-1-h+\delta_\theta+\phi\varepsilon]} \mu^{\varepsilon-1-h} + \mu R_{g-1}^{(\phi,\tau)}$$

wherein $\varepsilon$ represent the block size and $\phi$ and $\tau$ are the indices to identify a block, wherein $V^{[i]} = W^{[i]}$ when it is used in calculations for the first time and $V^{[i]} = 0$ otherwise, where $W^{[i]}$ is the $i^{th}$ digit of the number to be reduced, W, and wherein the outer two summations can be implemented in any way as long as the significance is taken into consideration.

15. A finite field multiplication/reduction structure in an XZ Elliptic curve cryptographic system for communicating securely over an insecure communication channel of the type which communicates a message from a transmitter to a receiver according to claim 14, wherein the outer summations are implemented as a serial-serial accumulation.

16. A method for finite field multiplication in which an operand multiplication and a field reduction are calculated as a serial-serial multiplication, wherein the formula for least-to-most significant first computation is:

$$R_g^* = x_{g+\delta-\delta_R-\delta_X} y_{g+\delta-\delta_R-\delta_Y} \mu^{g+2\delta-\delta_X-\delta_Y-2\delta_R} + \qquad (18)$$

$$x_{g+\delta-\delta_R-\delta_X} \mu^{\delta-\delta_X-\delta_R} \sum_{j=0}^{g+\delta-\delta_R-1} y_{j-\delta_Y} \mu^{j-\delta_Y} +$$

$$y_{g+\delta-\delta_R-\delta_Y} \mu^{\delta-\delta_Y-\delta_R} \sum_{i=0}^{g+\delta-\delta_R-1} x_{i-\delta_X} \mu^{i-\delta_X} +$$

$$\theta^{[g+\delta-\delta_R-\delta_\theta]} R_{g-\delta_R}^{*[0]} \mu^{g+\delta-\delta_\theta-2\delta_R} +$$

$$\theta^{[g+\delta-\delta_R-\delta_\theta]} \mu^{\delta-\delta_R} \sum_{k=0}^{g-\delta_R-1} R_k^{*[0]} \mu^k +$$

$$R_{g-\delta_R}^{*[0]} \mu^{-\delta_R} \sum_{h=0}^{g+\delta-\delta_R-1} \theta^{[h-\delta_\theta]} \mu^h + \mu^{-1} R_{g-1}^*$$

and wherein the formula for most-to-least significant first computation is:

$$R_g = x_{d+\delta_X-g} y_{d+\delta_Y-g} \mu^{2(d-g)+\delta_X+\delta_Y} + \qquad (19)$$

$$x_{d+\delta_X-g} \mu^{d+\delta_X-g} \sum_{j=0}^{g-2} y_{d+\delta_Y-j-1} \mu^{d+\delta_Y-j-1} +$$

$$y_{d+\delta_Y-g} \mu^{d+\delta_Y-g} \sum_{i=0}^{g-2} x_{d+\delta_X-i-1} \mu^{d+\delta_X-i-1} +$$

-continued $$\theta^{[d+\delta_\theta-g]} R_{g-\delta-1}^{[g-\delta-1]} \mu^{d-\delta-1} + \theta^{[d+\delta_\theta-g]} \mu^{d-g} \sum_{k=0}^{g-\delta-2} R_k^{[k]} \mu^k +$$

$$R_{g-\delta-1}^{[g-\delta-1]} \mu^{g-\delta-1} \sum_{h=0}^{g-2} \theta^{[d+\delta_\theta-h-1]} \mu^{d-h-1} + \mu R_{g-1}$$

in an XZ Elliptic curve cryptographic system for communicating securely over an insecure communication channel of the type which communicates a message from a transmitter to a receiver.

17. A finite field multiplication structure for use in an XZ Elliptic curve cryptographic system for communicating securely over an insecure communication channel of the type which communicates a message from a transmitter to a receiver according to claim 16, which is implemented either as a pure hardware unit, as a program stored on a computer readable storage device and executed on a digital computer, or as a combination of both.

18. A finite field multiplication structure for use in an XZ Elliptic curve cryptographic system for communicating securely over an insecure communication channel of the type which communicates a message from a transmitter to a receiver according to claim 17, wherein an operand multiplication and a field reduction are performed using two serial-serial multiplication structures.

19. A finite field multiplication structure for use in an XZ Elliptic curve cryptographic system for communicating securely over an insecure communication channel of the type which communicates a message from a transmitter to a receiver according to claim 17, wherein the computation of an operand multiplication and the computation of a field reduction are multiplexed or interleaved on a single serial-serial multiplication structure.

* * * * *